US011971756B2

(12) United States Patent
Kim

(10) Patent No.: US 11,971,756 B2
(45) Date of Patent: Apr. 30, 2024

(54) ELECTRONIC DEVICE INCLUDING FLEXIBLE DISPLAY

(71) Applicant: SAMSUNG ELECTRONICS CO., LTD., Suwon-si (KR)

(72) Inventor: Jongyoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 304 days.

(21) Appl. No.: 17/569,912

(22) Filed: Jan. 6, 2022

(65) Prior Publication Data

US 2022/0236773 A1 Jul. 28, 2022

Related U.S. Application Data

(63) Continuation of application No. PCT/KR2021/020304, filed on Dec. 30, 2021.

(30) Foreign Application Priority Data

Jan. 27, 2021 (KR) .................. 10-2021-0011583

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)
(58) Field of Classification Search
CPC .... G06F 1/1616; G06F 1/1652; G06F 1/1681; H04M 1/0268
See application file for complete search history.

(56) References Cited

U.S. PATENT DOCUMENTS

| 6,053,589 A * | 4/2000 | Lin .................. G06F 1/1616 312/271 |
| 9,348,370 B2 * | 5/2016 | Song ................ G06F 1/1681 |
| 9,557,771 B2 | 1/2017 | Park et al. |

(Continued)

FOREIGN PATENT DOCUMENTS

| CN | 111866235 | 10/2020 |
| JP | 10-2020-0051104 | 5/2020 |

(Continued)

OTHER PUBLICATIONS

Search Report dated Apr. 18, 2022 in International Application No. PCT/KR2021/020304.

*Primary Examiner* — Anthony Q Edwards
(74) *Attorney, Agent, or Firm* — Nixon & Vanderhye, P.C.

(57) ABSTRACT

An electronic device is disclosed. The electronic device includes: a first housing, a second housing, a flexible display disposed on the first housing and the second housing, a support plate disposed on a rear surface of the flexible display, and a connection structure disposed beneath the support plate and connecting the first housing and the second housing to each other, the connection structure includes a pin member comprising at least one pin coupled to the support plate through the support plate, and an elastic member comprising an elastic material configured to be compressed or tensioned based on the first housing and the second housing being folded or unfolded to provide an elastic force to the pin member, and the pin member is configured to provide a force in a first direction toward the connection structure to the flexible display.

20 Claims, 15 Drawing Sheets

(56) References Cited

U.S. PATENT DOCUMENTS

| | | |
|---|---|---|
| 9,729,688 B2 | 8/2017 | Lee et al. |
| 10,061,358 B2* | 8/2018 | Lee ..................... H04M 1/0237 |
| 10,070,546 B1* | 9/2018 | Hsu ..................... E05D 11/1028 |
| 10,585,457 B2 | 3/2020 | Park |
| 10,627,867 B2* | 4/2020 | Cheng ..................... H04M 1/02 |
| 10,827,633 B2 | 11/2020 | Yoo et al. |
| 10,856,430 B2 | 12/2020 | Yoo et al. |
| 10,948,947 B2 | 3/2021 | Yoon et al. |
| 2015/0366089 A1 | 12/2015 | Park et al. |
| 2016/0011631 A1* | 1/2016 | Lee ..................... G06F 1/1681 |
| | | 361/679.55 |
| 2016/0127525 A1 | 5/2016 | Lee et al. |
| 2017/0364119 A1 | 12/2017 | Lee et al. |
| 2018/0160553 A1* | 6/2018 | Yeh ..................... G06F 1/1681 |
| 2018/0324964 A1* | 11/2018 | Yoo ..................... H01Q 1/2266 |
| 2019/0112852 A1* | 4/2019 | Hsu ..................... G06F 1/1618 |
| 2019/0179373 A1 | 6/2019 | Cheng et al. |
| 2020/0192435 A1 | 6/2020 | Park |
| 2021/0007229 A1 | 1/2021 | Gu et al. |
| 2021/0307185 A1* | 9/2021 | Hong ..................... H05K 5/0226 |
| 2021/0307186 A1* | 9/2021 | Hong ..................... H04M 1/0216 |

FOREIGN PATENT DOCUMENTS

| | | |
|---|---|---|
| KR | 10-2015-0142290 | 12/2015 |
| KR | 10-2016-0050698 | 5/2016 |
| KR | 2017-192659 | 10/2017 |
| KR | 10-2017-0141438 | 12/2017 |
| KR | 10-2018-0122210 | 11/2018 |
| KR | 10-2018-0131143 | 12/2018 |
| KR | 10- 2019-0013992 | 2/2019 |
| KR | 10-2019-0050325 | 5/2019 |

* cited by examiner

ELECTRONIC DEVICE INCLUDING FLEXIBLE DISPLAY

CROSS-REFERENCE TO RELATED APPLICATIONS

This application is a continuation of International Application No. PCT/KR2021/020304 designating the United States, filed on Dec. 30, 2021, in the Korean Intellectual Property Receiving Office and claiming priority to Korean Patent Application No. 10-2021-0011583, filed on Jan. 27, 2021, in the Korean Intellectual Property Receiving Office, the disclosures of which are incorporated by reference herein in their entireties.

BACKGROUND

Field

The disclosure relates to an electronic device including a flexible display.

Description of Related Art

An electronic device may provide not only a voice call or a short message service, but also various functions such as media content reproduction, a game, web surfing, and the like. For a user to conveniently use the various functions of the electronic device, a display of the electronic device may need to be widened. However, as the display becomes wider, portability of the electronic device may decrease. Accordingly, a foldable electronic device that may be folded or unfolded by mounting a flexible display is being developed. Because the user may carry the foldable electronic device in a folded state, and unfold the foldable electronic device to use the display having a wide screen, the portability and usability of the electronic device may be improved.

A flexible display may include a flexible region that may be deformed at least partially into a curved surface or a flat surface in response to a folding operation or an unfolding operation of a foldable electronic device. Stress may be applied to the flexible region based on the folding operation of the foldable electronic device. When the operations of folding and unfolding the foldable electronic device are repeated, permanent deformation such as an increase in a length of the flexible region may occur. Therefore, the flexible region may be lifted compared to other regions, or crease may occur in the flexible region.

SUMMARY

An electronic device according to an example embodiment of the disclosure includes: a first housing, a second housing, a flexible display disposed on the first housing and the second housing, wherein the flexible display includes a flexible region deformable into a flat surface or a curved surface, a support plate disposed on a rear surface of the flexible display at least partially overlapping the flexible region, wherein the support plate includes a first region attached to the rear surface of the flexible display, and a connection structure disposed beneath the support plate and overlapping the flexible region, wherein the connection structure connects the first housing and the second housing to each other such that the first housing and the second housing are able to be folded or unfolded about a folding axis therebetween, the connection structure includes a pin member comprising at least one pin at least partially coupled to the support plate through a second region different from the first region of the support plate, and an elastic member comprising an elastic material configured to be compressed or tensioned based on the first housing and the second housing being folded or unfolded to provide an elastic force to the pin member, and the pin member is configured to provide a force in a first direction toward the connection structure to the flexible region of the flexible display through the support plate.

An electronic device according to an example embodiment of the disclosure includes: a foldable housing including a first housing and a second housing, a flexible display disposed on the foldable housing, wherein the flexible display includes a first portion overlapping the first housing, a second portion overlapping the second housing, and a flexible portion extending from the first portion to the second portion and being deformable into a flat surface or a curved surface, a support plate disposed on a rear surface of the flexible display at least partially overlapping the flexible region, wherein the support plate includes a first region attached to the rear surface of the flexible display, a connection structure disposed beneath the support plate and overlapping the flexible region, wherein the connection structure connects the first housing and the second housing to each other such that the first housing and the second housing are able to be folded or unfolded about a folding axis therebetween, a pin member penetrating the support plate and the connection structure to couple the support plate and the connection structure to each other, wherein the pin penetrates a second region different from the first region of the support plate, and an elastic member comprising an elastic material configured to be compressed or tensioned based on the foldable housing being folded or unfolded to provide an elastic force to the pin member, and the pin member is configured to provide a force in a first direction from the display toward the connection structure to the flexible region of the flexible display through the support plate.

According to various example embodiments of the disclosure, it is possible to improve a surface quality of the flexible display by preventing and/or reducing the flexible display from being deformed and lifted or creased.

According to various example embodiments of the disclosure, it is possible to reduce or prevent deterioration of the surface quality resulted from the change in the length of the flexible display through a structure that may cancel a reaction force generated when the flexible display is deformed based on the folding operation.

According to various example embodiments of the disclosure, the surface quality of the flexible display may be maintained or improved through a structure in which the flexible display may be pulled inward of the electronic device.

According to various example embodiments of the disclosure, it is possible to improve the surface quality of the flexible display through a pulling structure that pulls the flexible display in both outward directions.

In addition, various effects that are directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Hereinafter, various example embodiments of the disclosure will be described in greater detail with reference to the accompanying drawings. However, this is not intended to limit the disclosure to specific embodiments, and it should be understood to include various modifications, equivalents, and/or alternatives of embodiments of the disclosure.

Figure 1A:
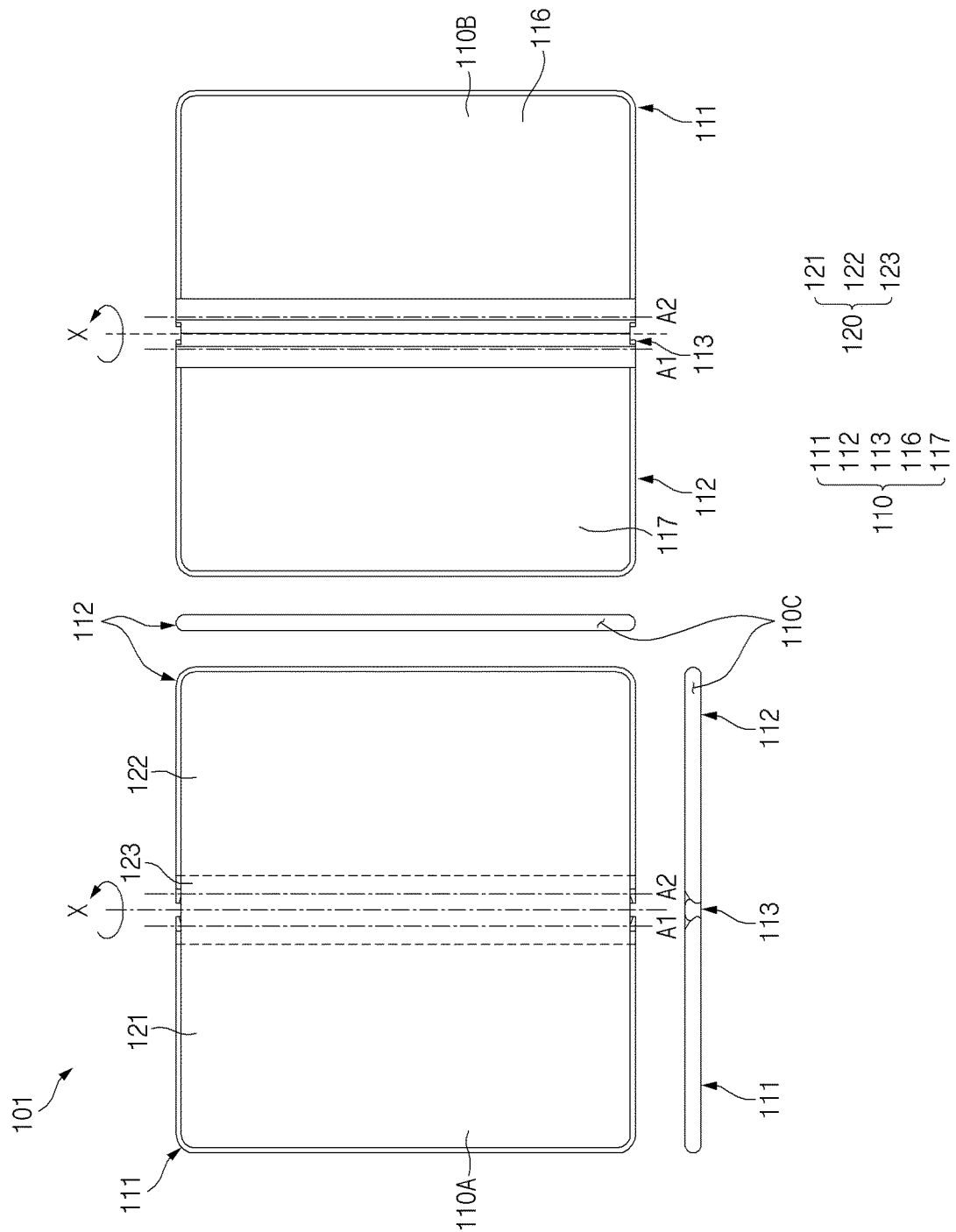
FIG. 1A is a diagram illustrating a foldable electronic device in an unfolded state, according to various embodiments.

FIG. 1A is a diagram illustrating a foldable electronic device in an unfolded state, according to various embodiments.

Figure 1B:
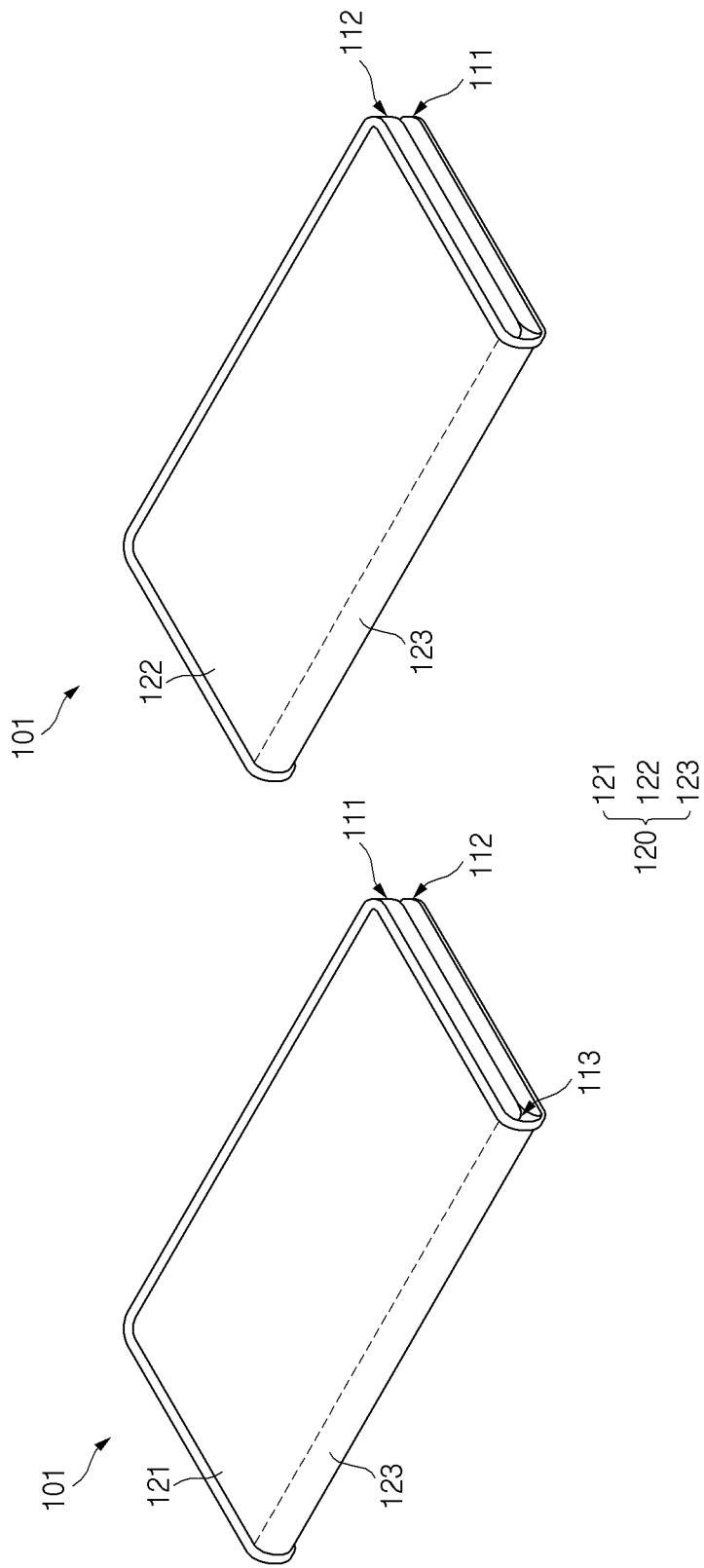
FIG. 1B is a diagram illustrating a foldable electronic device in a folded state, according to various embodiments.

FIG. 1B is a diagram illustrating a foldable electronic device in a folded state, according to various embodiments.

Referring to FIGS. 1A and 1B, an electronic device 101 according to an embodiment may include a foldable housing 110, a connection structure (e.g., a hinge) 113, and a flexible display 120 (or the "foldable display 120", hereinafter, the "display 120"). In the disclosure, a surface on which the display 120 is disposed is defined as a first surface 110A or the front surface 110A of the electronic device 101. In addition, an opposite surface of the front surface 110A is defined as a second surface 110B or the rear surface 110B of the electronic device 101. In addition, a surface surrounding a space between the front surface 110A and the rear surface 110B is defined as a third surface 110C or the side surface 110C of the electronic device 101.

In an embodiment, the foldable housing 110 may include a first housing 111 (or the "first housing structure 111"), a second housing 112 (or the "second housing structure 112"), a first rear surface cover 116, and a second rear surface cover 117. The foldable housing 110 of the electronic device 101 may not be limited to a form and a coupling shown in FIGS. 1A and 1B, and may be implemented with a different form or a combination and/or a coupling of components. For example, in an embodiment, the first housing 111 and the first rear surface cover 116 may be integrally formed, and the second housing 112 and the second rear surface cover 117 may be integrally formed.

In an embodiment, the first housing 111 and the second housing 112 may be disposed on both sides around the connection structure 113. For example, when viewing the front surface 110A of the electronic device 101 in FIG. 1, the first housing 111 may be disposed on a left side with respect to a center (e.g., a folding axis X) of the connection structure 113. For example, when viewing the front surface 110A of the electronic device 101 in FIG. 1, the second housing 112 may be disposed on a right side with respect to the center (e.g., the folding axis X) of the connection structure 113.

In an embodiment, the first housing 111 and the second housing 112 may form the side surface 110C of the electronic device 101 together with the connection structure 113. In an embodiment, the side surface 110C of the electronic device 101 may include a side surface region of the first housing 111, a side surface region of the second housing 112, and both ends of the connection structure 113 exposed between the first housing 111 and the second housing 112.

In an embodiment, the first rear surface cover 116 may be coupled with the first housing 111 to form a portion of the rear surface 110B of the electronic device 101. The second rear surface cover 117 according to an embodiment may be coupled with the second housing 112 to form a portion of the rear surface 110B of the electronic device 101. In an embodiment, the rear surface 110B of the electronic device 101 may include the first rear surface cover 116, a partial region of the first housing 111 adjacent to the first rear surface cover 116, the second rear surface cover 117, and a partial region of the second housing 112 adjacent to the second rear surface cover 117.

In an embodiment, the first rear surface cover 116 may be disposed on the right side of the folding axis X when the electronic device 101 is viewed from the rear surface 110B. In an embodiment, the first rear surface cover 116 may have, for example, a substantially rectangular periphery, and the periphery may be surrounded by the first housing 111. In an embodiment, the second rear surface cover 117 may be disposed on an opposite side of the first rear surface cover 116 with respect to the folding axis X. In an embodiment, a periphery of the second rear surface cover 117 may be surrounded by the second housing 112.

In the illustrated embodiment, the first rear surface cover 116 and the second rear surface cover 117 may have a substantially symmetrical shape about the folding axis X, but the disclosure may not be limited thereto. For example, the electronic device 101 may include the first rear surface cover 116 and the second rear surface cover 117 having various shapes (or different shapes). In an embodiment, the first rear surface cover 116 may be integrally formed with the first housing 111 and/or the second rear surface cover 117 may be integrally formed with the second housing 112.

In an embodiment, the first rear surface cover 116, the second rear surface cover 117, the first housing 111, and the second housing 112 may define an internal space in which various parts of the electronic device 101 may be placed. For example, as the first housing 111 and the second housing 112 opened in one direction (e.g., a direction of the rear surface 110B of the electronic device 101) are closed by the first rear surface cover 116 and the second rear surface cover 117, the internal space may be defined. In the internal space, for example, a battery (e.g., a battery 1289 in FIG. 12) for providing power required for the electronic device 101 may be disposed. As another example, at least one printed circuit board may be disposed in the internal space. On the at least one printed circuit board, various components (e.g., a processor (e.g., a processor 1220 in FIG. 12) and a memory (e.g., a memory 1230 in FIG. 12)) for implementing a function of the electronic device 101 may be placed. However, the disclosure is not limited by the above-mentioned example. For example, at least one of components shown in FIG. 12 may be disposed in the internal space.

In an embodiment, the connection structure 113 may be disposed between the first housing 111 and the second housing 112. In an embodiment, the connection structure 113 may be coupled with the first housing 111 and the second housing 112. In an embodiment, the first housing 111 and the second housing 112 may pivot relative to each other through the connection structure 113.

In an embodiment, the first housing 111, the second housing 112, and the connection structure 113 may define recess that accommodates the display 120 therein together. In an embodiment, the first housing 111, the second housing 112, and the connection structure 113 may support the display 120 seated in the recess. In an embodiment, at least a portion of the first housing 111, the second housing 112, and/or the connection structure 113 may be made of a metallic material or a non-metallic material having a selected magnitude of stiffness to support the display 120.

In an embodiment, the display 120 may be disposed over the first housing 111, the connection structure 113, and the second housing 112. For example, the display 120 may extend from the first housing 111 to the second housing 112 across the connection structure 113. The display 120 may be disposed to be at least partially accommodated in the recess.

In an embodiment, the display 120 may form at least a portion of the front surface 110A of the electronic device 101. For example, the front surface 110A of the electronic device 101 may include the display 120, a partial region of the first housing 111 surrounding a periphery of the display 120, the second housing 112, and a partial region of the connection structure 113.

In an embodiment, the display 120 may include a first region 121, a second region 122, and a flexible region 123. In an embodiment, the flexible region 123 may be disposed between the first region 121 and the second region 122. In an embodiment, the first region 121 may correspond to the first housing 111. For example, the first region 121 may at least partially overlap the first housing 111. In an embodiment, the second region 122 may correspond to the second housing 112. For example, the second region 122 may at least partially overlap the second housing 112. In an embodiment, the flexible region 123 may correspond to the connection structure 113. For example, the flexible region 123 may at least partially overlap the connection structure 113. In an embodiment, the first region 121, the second region 122, and the flexible region 123 of the display 120 may also be referred to as the first portion 121, the second portion 122, and the flexible portion 123, respectively.

Hereinafter, a folding operation of the electronic device 101 will be described.

In an embodiment, the connection structure 113 may be coupled with the first housing 111 and the second housing 112 such that the first housing 111 and the second housing 112 are pivotable relative to each other. In an embodiment, the first housing 111 and the second housing 112 may pivot about at least one axis through the connection structure 113. For example, the first housing 111 and the second housing 112 may pivot about the folding axis X. As another example, the first housing 111 may pivot about a first axis A1, and the second housing 112 may pivot about a second axis A2. In an embodiment, based on the pivoting of the first housing 111 and/or the second housing 112, an angle formed by the first housing 111 and the second housing 112 may change. In an embodiment, in response to the change in the angle formed by the first housing 111 and the second housing 112, an angle formed by the first region 121 of the display 120 supported by the first housing 111 and the second region 122 of the display 120 supported by the second housing 112 may change.

In an embodiment, the connection structure 113 may be bent based on the pivoting of the first housing 111 and/or the second housing 112. In an embodiment, as the angle formed by the first housing 111 and the second housing 112 decreases, a degree to which the connection structure 113 is bent may be increased. In an embodiment, as the angle formed by the first housing 111 and the second housing 112 increases, the connection structure 113 may be gradually unfolded. In an embodiment, corresponding to a bent state of the connection structure 113, the flexible region 123 of the display 120 supported by the connection structure 113 may be deformed. For example, the flexible region 123 of the display 120 may be deformed at least partially into a curved surface or a flat surface when the connection structure 113 is bent or unfolded.

In an embodiment, as the connection structure 113 is bent or unfolded based on the pivoting of the first housing 111 and/or the second housing 112, the electronic device 101 may be folded or unfolded.

In an embodiment, when the electronic device 101 is in a flat state (or the unfolded state) (e.g., FIG. 1A), the first housing 111 and the second housing 112 may be disposed to be directed in the same direction while forming a first angle (e.g., 180 degrees). In an embodiment, a surface of the first region 121 of the display 120 and a surface of the second region 122 may form the first angle with each other, and may be directed in the same direction (e.g., a direction of the front surface 110A of the electronic device 101). In an embodiment, the first region 121, the second region 122, and the flexible region 123 of the display 120 may form the same plane.

In an embodiment, when the electronic device 101 is in the folded state (e.g., FIG. 1B), the first housing 111 and the second housing 112 may be disposed to face each other while forming a second angle (e.g., 0 degrees) smaller than the first angle. In an embodiment, when the electronic device 101 is in the folded state, the first rear surface cover 116 and the second rear surface cover 117 may face each other, and the first rear surface cover 116 and the second rear surface cover 117 may not be visible from the outside of the electronic device 101. In an embodiment, in the folded state, the flexible region 123 may be formed of a curved surface, at least a portion of which has a predetermined curvature. In an embodiment, in the folded state, the surface of the first region 121 and the surface of the second region 122 of the display 120 may be visible from the outside of the electronic device 101 and may be directed in opposite directions.

In an embodiment, when the electronic device 101 is in an intermediate state, the first housing 111 and the second housing 112 may be disposed at a third angle (e.g., in a range from 0 degrees to 180 degrees) between the first angle and the second angle. The intermediate state, although not shown, may refer, for example, to a state between the flat state illustrated in FIG. 1A and the folded state illustrated in FIG. 1B. In an embodiment, in the intermediate state, the surface of the first region 121 and the surface of the second region 122 of the display 120 may form an angle smaller than that in the flat state and larger than that in the folded state. In an embodiment, in the intermediate state, the flexible region 123 may be formed of a curved surface, at least a portion of which has a predetermined curvature. The curvature in this case may be smaller than that in the folded state.

Figure 2:
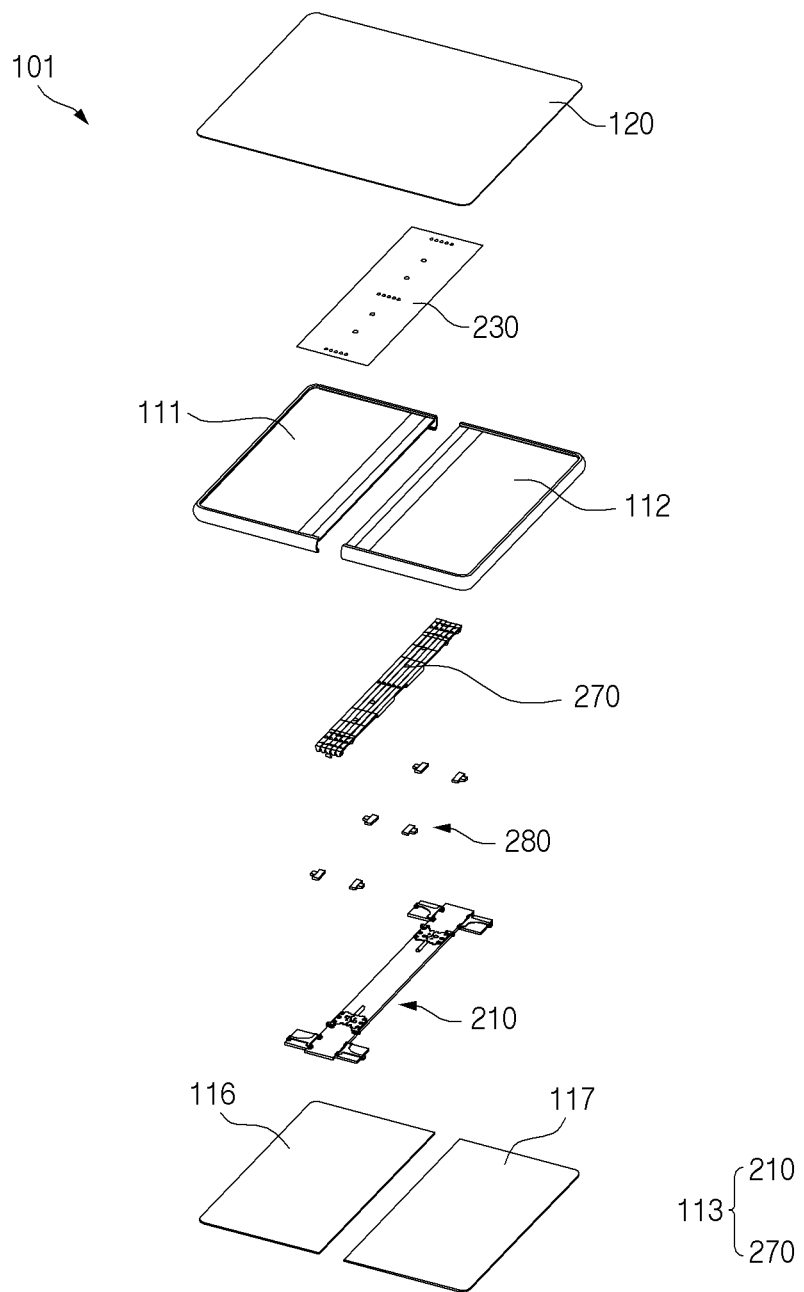
FIG. 2 is an exploded perspective view of an electronic device according to various embodiments.

FIG. 2 is an exploded perspective view of a foldable electronic device according to various embodiments.

In FIG. 2, a duplicate description of components having the same reference numerals as those of the above-described components (e.g., the display 120 in FIG. 1) may not be repeated.

Referring to FIG. 2, the electronic device 101 according to an embodiment may include a support plate 230, and the connection structure 113 may include a hinge module (or a hinge structure) 210, and a multi-bar module (or a multi-bar structure) 270.

In an embodiment, the support plate 230 may be disposed between the display 120 and the multi-bar module 270. In an embodiment, the support plate 230 may be disposed on a rear surface of the display 120 (e.g., a surface of the display 120 directed in a direction opposite to the front surface 110A in FIG. 1). In an embodiment, the support plate 230 may be partially attached to the rear surface of the display 120. The support plate 230 disposed beneath the display 120 may support the display 120 together with the multi-bar module 270. The support plate 230 may have a specified thickness so as to be at least partially bent or curved. For example, the specified thickness may be about 0.05 mm to 0.08 mm, but may not be limited thereto. The support plate 230 may contain a metal (e.g., stainless steel) or a resin (e.g., polypropylene).

In an embodiment, the hinge module 210 may be disposed beneath the multi-bar module 270. The hinge module 210 may be positioned between the first housing 111 and the second housing 112.

In an embodiment, the hinge module 210 may be coupled to the first housing 111 and the second housing 112 such that the first housing 111 and the second housing 112 are pivotable relative to each other. Through the hinge module 210, the first housing 111 and the second housing 112 may be pivotable about the at least one axis (e.g., "the folding axis X in FIG. 1A" or "the first axis A1 and the second axis A2 in FIG. 1A").

For example, the hinge module 210 may include a hinge shaft disposed on the same line as a folding axis (e.g., the folding axis X in FIG. 1A) of the electronic device 101, a first plate pivotable about the hinge shaft and coupled to the first housing 111, and a second plate pivotable about the hinge shaft and coupled to the second housing 112. In this case, the first housing 111 and the second housing 112 may pivot about the folding axis.

As another example, the hinge module 210 may include a first hinge shaft disposed on the same line as a first axis (e.g., the first axis A1 in FIG. 1A), a second hinge shaft disposed on the same line as a second axis (e.g., the second axis A2 in FIG. 1A), a plurality of gears that link a pivoting operation of the first hinge shaft and a pivoting operation of the second hinge shaft with each other, a center plate on which the first hinge shaft and the second hinge shaft are seated, the first plate that pivots about the first hinge shaft and is coupled to the first housing, and the second plate that pivots about the second hinge shaft and is coupled to the second housing. In this case, the first housing 111 and the second housing 112 may pivot about the first axis and the second axis, respectively.

In an embodiment, the hinge module 210 may partially overlap each of the first rear surface cover 116 and the second rear surface cover 117. For example, the hinge module 210 may include a portion overlapping the first rear surface cover 116, a portion positioned between the first rear surface cover 116 and the second rear surface cover 117, and a portion overlapping the second rear surface cover 117. In an embodiment, the portion of the hinge module 210 positioned between the first rear surface cover 116 and the second rear surface cover 117 may be visible from the outside of the electronic device 101 (or may be exposed to the outside).

In an embodiment, the multi-bar module 270 may be disposed between the support plate 230 and the hinge module 210. In an embodiment, the multi-bar module 270 may overlap the support plate 230. For example, the multi-bar module 270 may at least partially overlap the support plate 230 with respect to a direction perpendicular to a longitudinal direction thereof.

In an embodiment, the multi-bar module 270 may be coupled to the hinge module 210. The multi-bar module 270 may support the display 120 such that the display 120 does not bend inward (or in a direction toward the hinge module 210) of the electronic device 101.

In an embodiment, the multi-bar module 270 may be disposed between the first housing 111 and the second housing 112. One end (or one side) of the multi-bar module 270 may be coupled to the first housing 111, and the other end (or the other side) thereof may be coupled to the second housing 112. The multi-bar module 270 may be bent based on the pivoting of the first housing 111 and/or the second housing 112. In an embodiment, the multi-bar module 270 may form a curved surface while being bent, and the support plate 230 and the flexible region 123 of the display 120 may be deformed to correspond to the curved surface of the multi-bar module 270.

The electronic device 101 according to an embodiment may include a pulling structure 280 coupled with the multi-bar module 270. The pulling structure 280 will be described in greater detail below with reference to FIGS. 8, 9, 10 and 11.

Figure 3:
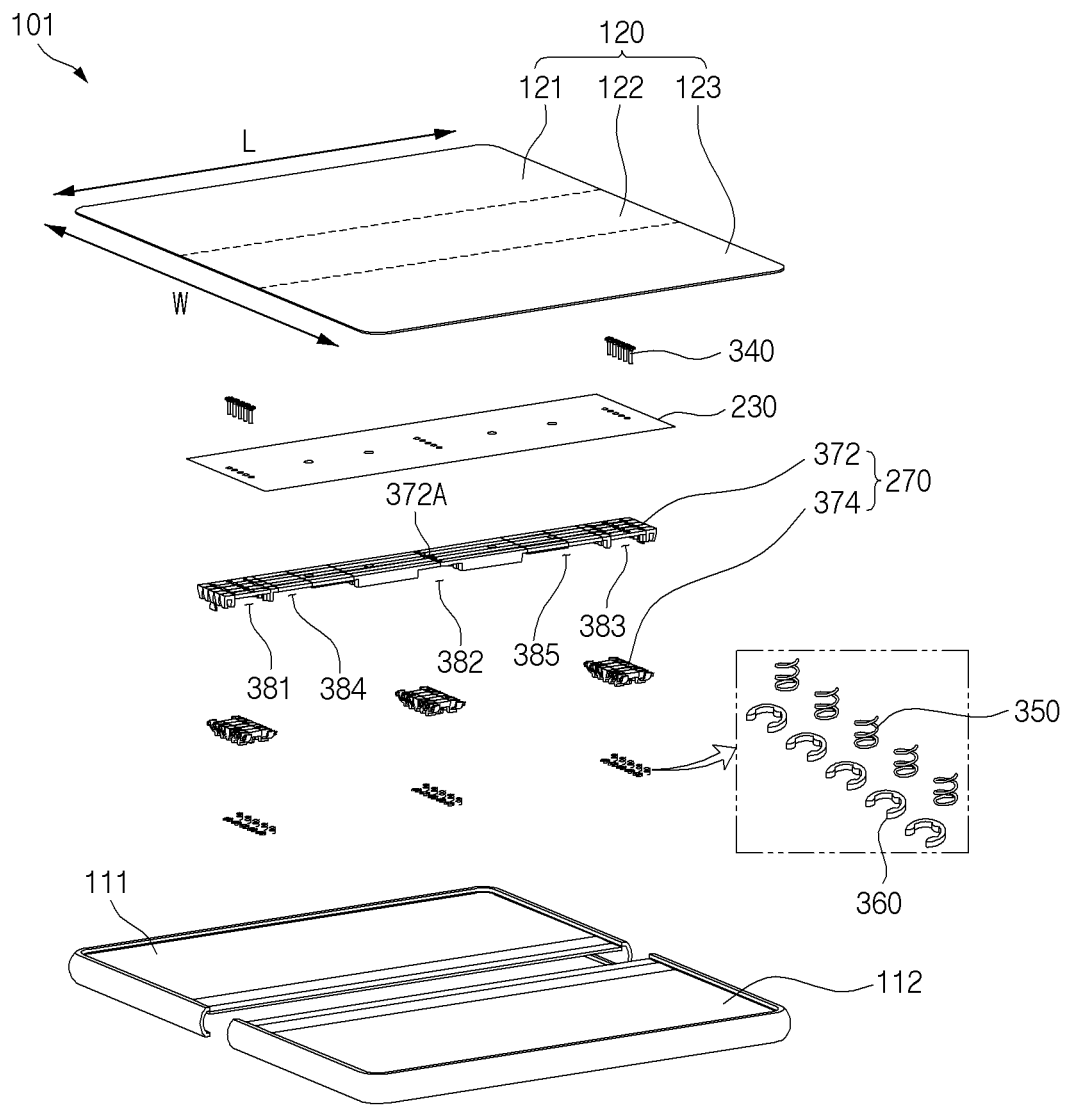
FIG. 3 is an exploded perspective view of an electronic device according to various embodiments.

FIG. 3 is an exploded perspective view of a foldable electronic device according to various embodiments.

In FIG. 3, some of the components shown in FIG. 2 are omitted, and components not shown in FIG. 2 are additionally illustrated. This is for convenience of description, and is not intended to limit an embodiment shown in FIG. 3 and an embodiment shown in FIG. 2 as separate embodiments.

In FIG. 3, a duplicate description of components having the same reference numerals as those of the above-described components may not be repeated.

Referring to FIG. 3, the multi-bar module 270 of the electronic device 101 according to an embodiment may include a pin member 340, an elastic member 350, a fixing member 360, upper bars 372, and lower bars 374.

In an embodiment, the pin member (e.g., including at least one pin) 340 may penetrate the support plate 230, the upper bars 372, and the lower bars 374. The pin member 340 may be coupled to the support plate 230, the upper bars 372, and the lower bars 374. A plurality of holes through which the pin member 340 passes may be provided in the support plate 230, the upper bars 372, and the lower bars 374.

In an embodiment, the elastic member (e.g. a coil comprising an elastic material) 350 may be coupled to the pin member 340. The fixing member 360 may be fixedly disposed at one end of the pin member 340 such that the elastic member 350 coupled to the pin member 340 does not deviate.

In an embodiment, the upper bars 372 may include a plurality of bars extending with a first length along a longitudinal direction L of the display 120. The plurality of bars may be arranged along a width direction W of the display 120.

In an embodiment, in the upper bars 372, a plurality of grooves recessed in a direction toward the display 120 may be defined. In an embodiment, the lower bars 374 may be seated in each of a first groove 381, a second groove 382, and a third groove 383 among the plurality of grooves. In each of a fourth groove 384 and a fifth groove 385 among the plurality of grooves, a hinge module (e.g., the hinge module 210 in FIG. 3) may be accommodated at least partially. In an embodiment, a wiring member (e.g., a cable or a flexible printed circuit board) for connecting components disposed in the first housing 111 and the second housing 112 to each other may be disposed in each of at least some of the plurality of grooves.

In an embodiment, the lower bars 374 may include a plurality of bars extending with a second length smaller than the first length along the longitudinal direction L of the display 120 and arranged along the width direction W. A group of the lower bars 374 may be disposed to be spaced apart from each other by a predetermined distance along the direction in which the upper bars 372 extend.

In an embodiment, the lower bars 374 are placed beneath the upper bars 372 and coupled to the upper bars 372. For example, the upper bars 372 and the lower bars 374 may be coupled to each other through a screw (e.g., a screw 650 in FIG. 6) for binding.

Figure 4:
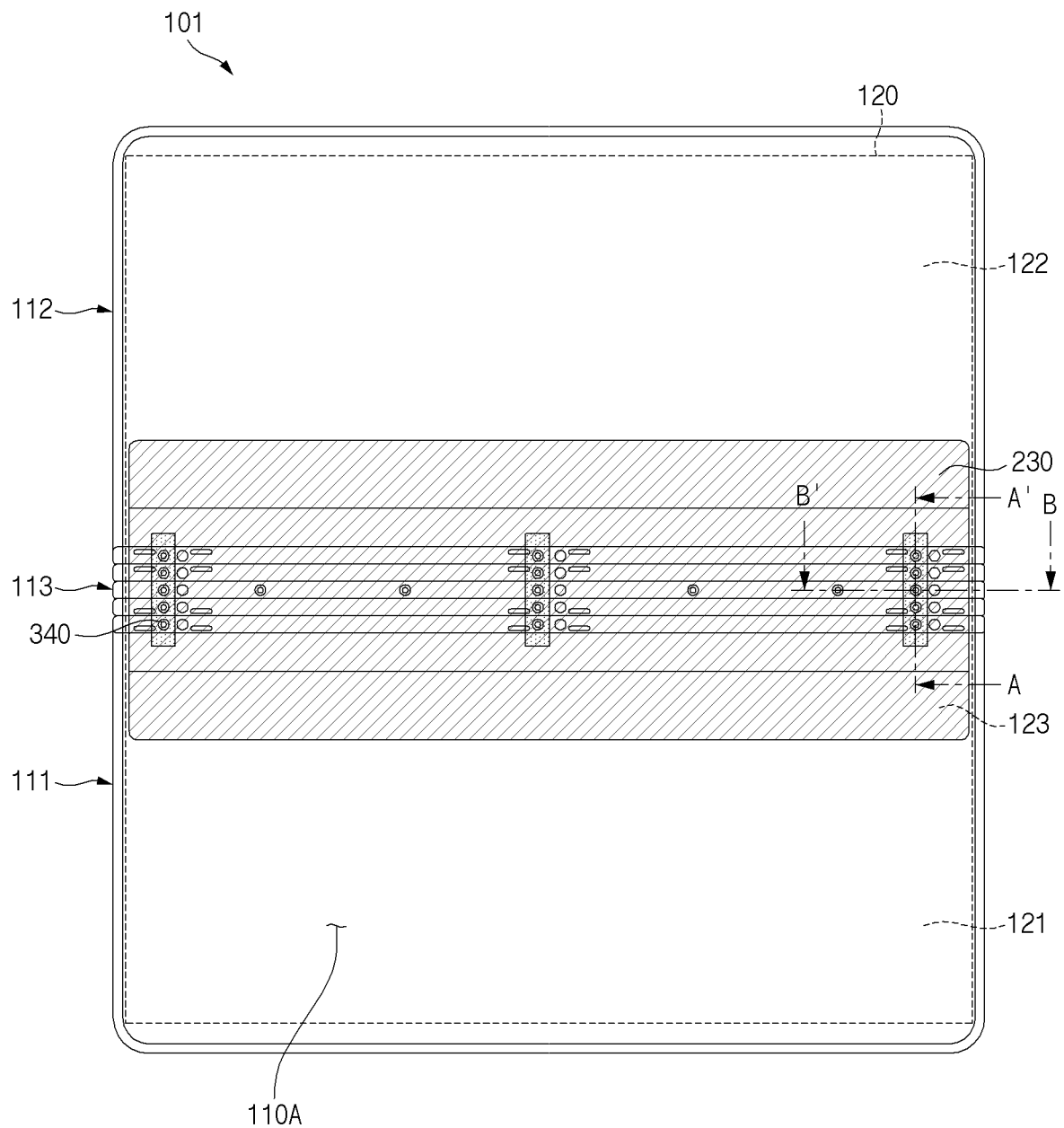
FIG. 4 is a front view projecting an electronic device according to various embodiments.

FIG. 4 is a front view projecting a foldable electronic device according to various embodiments.

In FIG. 4, the display 120 and a component (e.g., the first region 121) related thereto are illustrated with dotted lines.

Referring to FIG. 4, the support plate 230 according to an embodiment may include a first region 10, and a second region 20 surrounded by the first region 10 and extending along a width direction (e.g., the width direction W in FIG. 3) of the display 120. In an embodiment, the first region 10 of the support plate 230 may be attached to the rear surface of the display 120. For example, the first region 10 of the support plate 230 may be attached to the flexible region 123 of the display 120. In an embodiment, the second region 20 of the support plate 230 may not be attached to the display 120. In an embodiment, an adhesive member (not shown) (e.g., an adhesive member 615 of FIG. 6) may be interposed between the first region 10 of the support plate 230 and the display 120.

In an embodiment, the second region 20 of the support plate 230 may be penetrated by the pin member 340. The support plate 230 may be coupled to the connection structure 113 through the pin member 340. Holes through which the pin member 340 passes may be provided in the second region 20 of the support plate 230.

In an embodiment, at least a portion of the first region 121 of the display 120 may be attached to the first housing 111, and at least a portion of the second region 122 of the display 120 may be attached to the second housing 112.

In an embodiment, the support plate 230 may partially overlap each of the first housing 111, the second housing 112, and the connection structure 113. In an embodiment, the support plate 230 may include a first portion partially overlapping the first housing 111, a second portion partially overlapping the second housing 112, and a third portion positioned between the first portion and the second portion and overlapping the connection structure 113. In an embodiment, the first portion of the support plate 230 may be attached to the first housing 111 through an adhesive member (not shown) interposed between the first portion and the first housing 111. In an embodiment, the second portion of the support plate 230 may be attached to the second housing 112 through an adhesive member (not shown) interposed between the second portion and the second housing 112. In an embodiment, the third portion of the support plate 230 may be coupled to the connection structure 113 through the pin member 340.

Figure 5A:
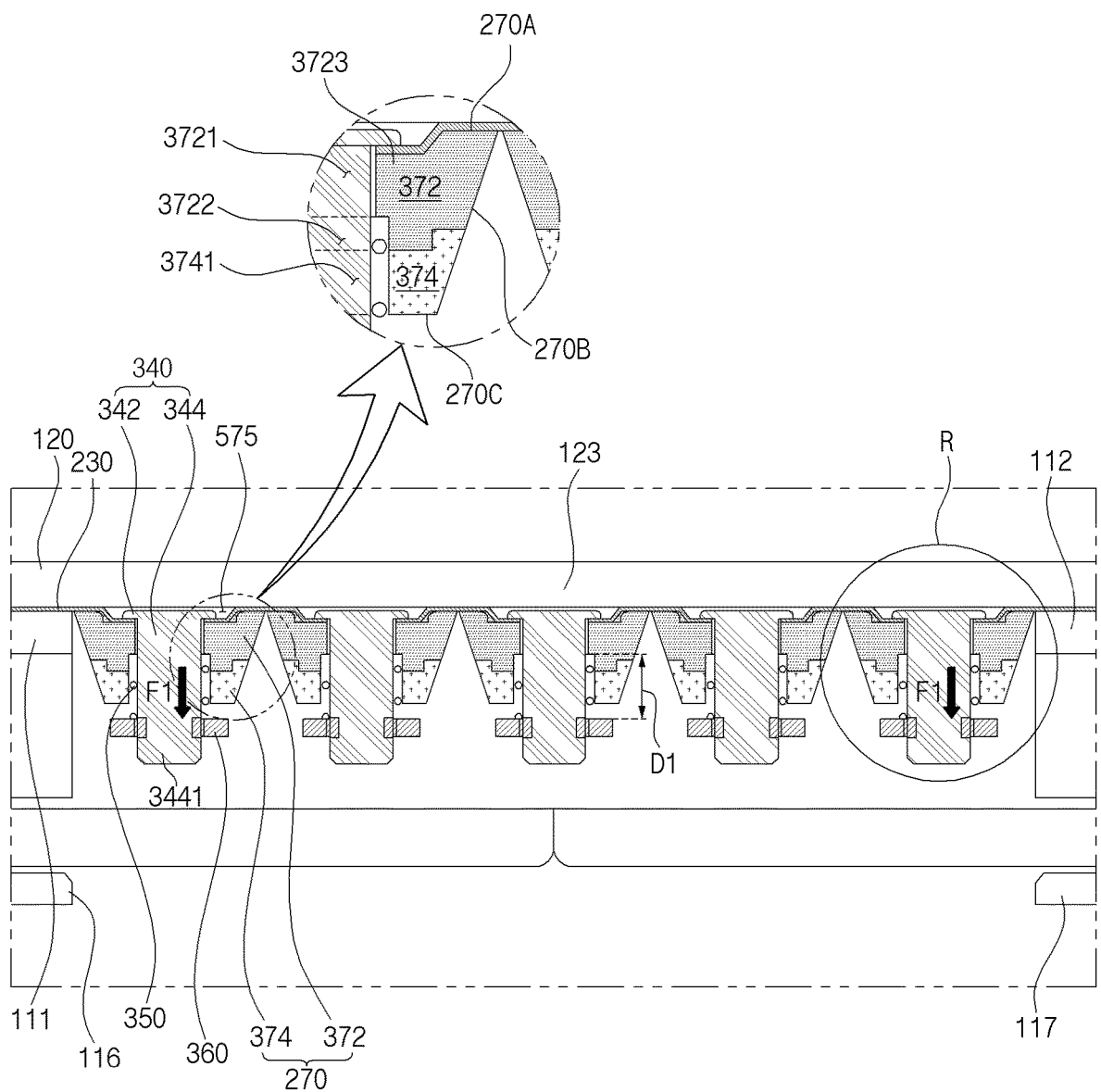
FIG. 5A is a cross-sectional view taken along a line A-A' of FIG. 4 according to various embodiments.

FIG. 5A is a cross-sectional view taken along a line A-A' of FIG. 4 according to various embodiments.

Figure 5B:
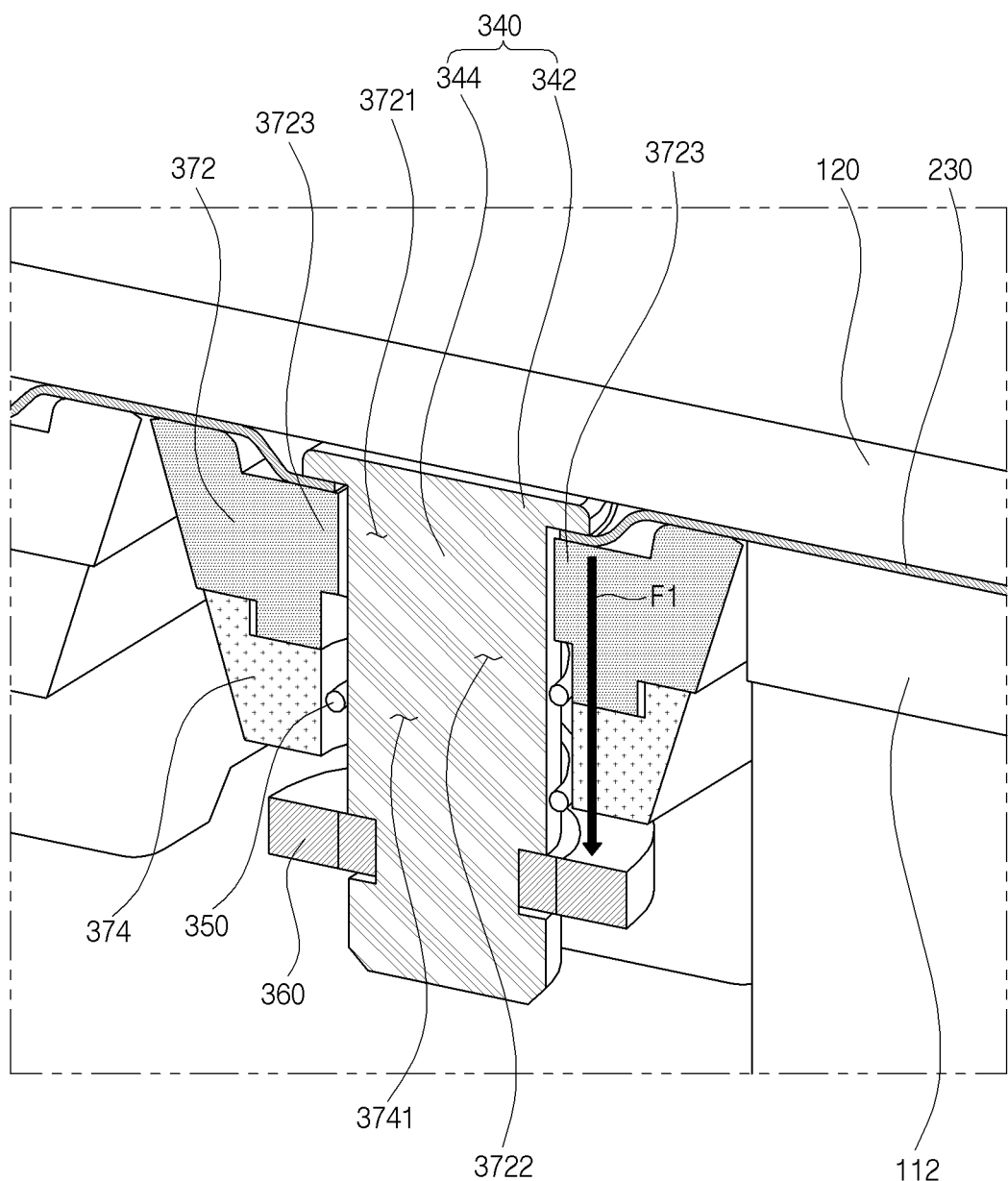
FIG. 5B is a cross-sectional perspective view showing a region R of FIG. 5A according to various embodiments.

FIG. 5B is a partial sectional perspective view showing a region R of FIG. 5A according to various embodiments.

FIGS. 5A and 5B may be diagrams illustrating the unfolded state of the foldable electronic device 101 according to various embodiments.

Referring to FIGS. 5A and 5B, a pin of the pin member 340 according to an embodiment may include a head 342 and a body 344. In an embodiment, the head 342 may be seated in an accommodating groove 575 provided with a specified depth in a first surface 270A of each upper bar 372. In an embodiment, the body 344 may extend from the head 342 and penetrate the support plate 230, each upper bar 372, and each lower bar 374. In an embodiment, an opening (or a hole) (not shown) penetrated by the body 344 may be defined in the support plate 230. In an embodiment, a first opening 3721 and a second opening 3722 penetrated by the body 344 may be defined in each upper bar 372. In an embodiment, the first opening 3721 may have substantially the same diameter as the opening defined in the support plate 230, but the disclosure may not be limited thereto. In an embodiment, the second opening 3722 may have a larger diameter than the first opening 3721, and thus, the support portion 3723 for supporting one end of the elastic member 350 may be formed. In an embodiment, a third opening 3741 penetrated by the body 344 of the pin member 340 may be defined in each lower bar 374. In an embodiment, the third opening 3741 may have substantially the same diameter as the second opening 3722 of each upper bar 372. The first opening 3721, the second opening 3722, and the third opening 3741 may communicate with each other.

In an embodiment, the body 344 may extend, from the head 342, in a direction substantially perpendicular to the direction in which the upper bars 372 extend (e.g., the longitudinal direction L in FIG. 3) and away from the display 120. In an embodiment, the head 342 may be formed to have a larger diameter than the first opening 3721 and the body 344 penetrating the first opening 3721 so as to press the support plate 230. In an embodiment, the support plate 230 may be locally recessed to correspond to a shape of the accommodating groove 575 by being pressed by the head 342 of the pin member 340. In an embodiment, the body 344 of the pin member 340 may extend to the outside of the third opening 3741 through the support plate 230, each upper bar 372, and each lower bar 374.

In an embodiment, at an end 3441 of the body 344, the fixing member (e.g., a ring, a snap ring, an e-ring, or the like, which may be referred to herein as a "fastener") 360 for preventing and/or reducing the deviation of the elastic member 350 may be disposed. In an embodiment, the fixing member 360 may be fixed to the end 3441 of the body 344.

For example, the fixing member 360 may include a snap ring like an E-ring. In this case, the fixing member 360 may be fixed to the end 3441 by being fitted into a groove defined in the end 3441.

In an embodiment, the elastic member 350 may be disposed between the head 342 of the pin member 340 and the fixing member 360. For example, the elastic member 350 may be fitted to the body 344 of the pin member 340 and may be compressed or tensioned by being supported by the fixing member 360. In an embodiment, the elastic member 350 may be disposed in a form of being at least partially accommodated in the second opening 3722 and the third opening 3741. In an embodiment, the second opening 3722 and the third opening 3741 may have a diameter capable of accommodating the body 344 of the pin member 340 and the elastic member 350 surrounding the body 344. In an embodiment, the elastic member 350 may include a coil spring, but the disclosure may not be limited thereto.

In an embodiment, the elastic member 350 may be located between the support portion 3723 formed in each upper bar 372 and the fixing member 360. In an embodiment, one end of the elastic member 350 may be supported by the support portion 3723 of each upper bar 372, and the other end thereof may be supported by the fixing member 360.

In an embodiment, in the unfolded state of the electronic device 101, the elastic member 350 may have a first length D1. The elastic member 350 having the first length D1 may be in a compressed state. In an embodiment, the compressed elastic member 350 may provide an elastic force in a first direction F1 to the pin member 340. In an embodiment, the pin member 340 may press the support plate 230 in the first direction F1. In an embodiment, the pin member 340 may provide a force in the first direction F1 to the display 120 through the support plate 230. In an embodiment, the first direction F1 may be a direction substantially parallel to a longitudinal direction of the pin member 340 and a direction from the display 120 toward the connection structure 113.

The first direction F1 shown in FIGS. 5A and 5B merely refers to a direction and does not indicate a magnitude of the elastic force based on an illustrated length (the same is applied to a second direction F2, a third direction F3, a fourth direction F4, and a fifth direction F5, which will be described in greater detail below).

Figure 6:
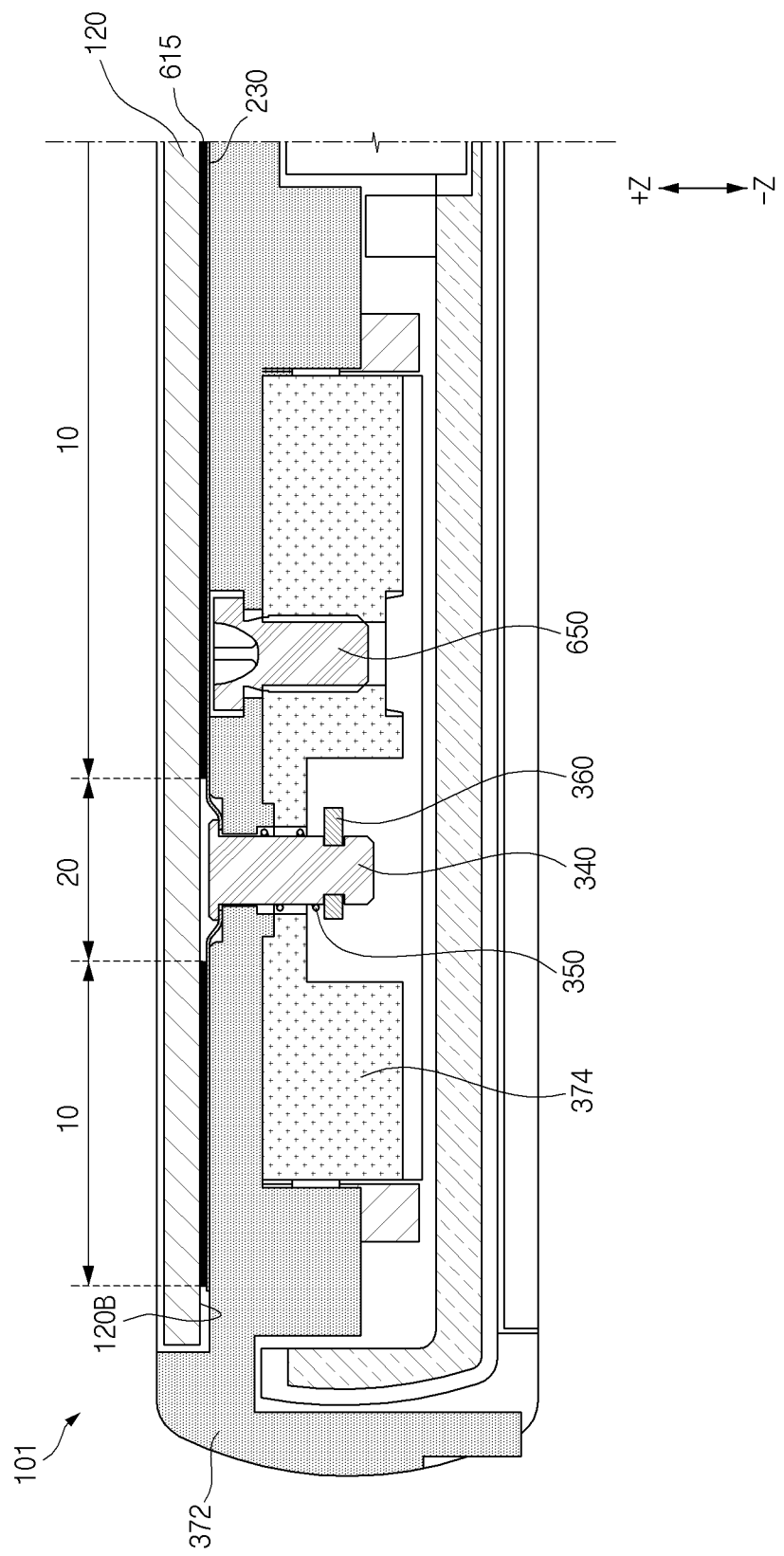
FIG. 6 is a cross-sectional view taken along a line B-B' of FIG. 4 according to various embodiments.

FIG. 6 is a cross-sectional view taken along a line B-B' of FIG. 4 according to various embodiments.

Referring to FIG. 6, the electronic device 101 according to an embodiment may include the screw member (e.g., a fastener or screw) 650 and the adhesive member (e.g., adhesive) 615.

In an embodiment, the screw member 650 may penetrate each upper bar 372 to be fastened to each lower bar 374. In an embodiment, each upper bar 372 and each lower bar 374 may be coupled to each other through the screw member 650.

In an embodiment, the adhesive member 615 may be interposed between the display 120 and the support plate 230. In an embodiment, the support plate 230 may be attached to a rear surface 120B of the display 120 in the first region 10 through the adhesive member 615. In an embodiment, the adhesive member 615 may not be disposed on the second region 20 of the support plate 230, and the second region 20 of the support plate 230 may not be attached to the rear surface 120B of the display 120.

In an embodiment, the pin member 340 may be disposed at a position corresponding to the second region 20 of the support plate 230. For example, the pin member 340 may penetrate the support plate 230, the upper bars 372, and the lower bars 374 in the second region 20 of the support plate 230.

In an embodiment, the elastic force acting while the elastic member 350 is compressed may be provided to the display 120 through the first region 10 of the support plate 230 attached to the display 120.

Figure 7A:
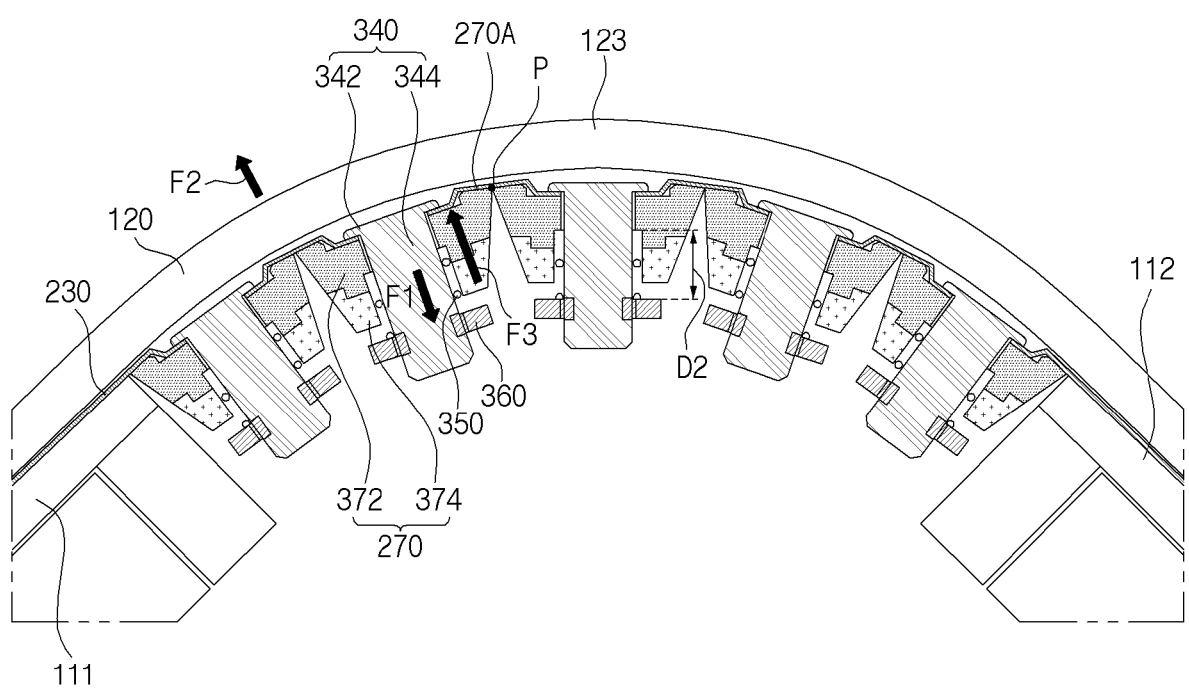
FIG. 7A is a cross-sectional view illustrating a foldable electronic device in an intermediate state, according to various embodiments.

FIG. 7A is a cross-sectional view illustrating a foldable electronic device in an intermediate state, according to various embodiments.

Figure 7B:
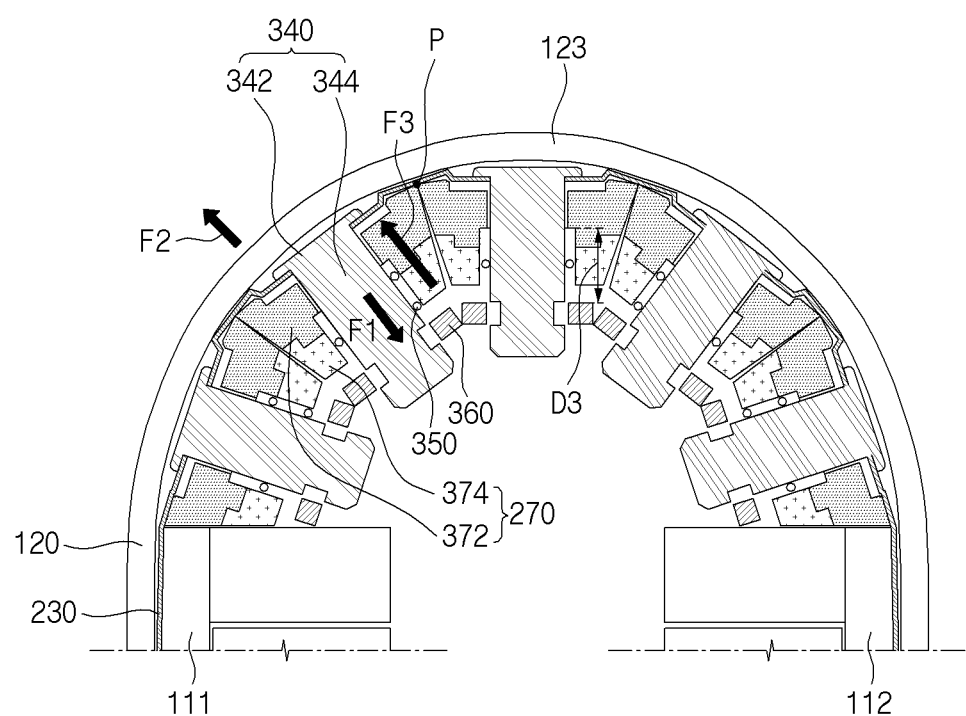
FIG. 7B is a cross-sectional view illustrating a foldable electronic device in a folded state, according to various embodiments.

FIG. 7B is a cross-sectional view illustrating a foldable electronic device in a folded state, according to various embodiments.

Hereinafter, the folding operation of the electronic device 101 will be described in greater detail with reference to FIGS. 5A, 7A, and 7B.

Referring to FIG. 5A, in an embodiment, each upper bar 372 and each lower bar 374 may have a trapezoidal shape as a whole in a state coupled to each other. For example, each upper bar 372 and each lower bar 374 may be coupled to each other to form a top surface 270A facing the display 120, a bottom surface 270C opposite to the top surface 270A, and a side surface 270B extending from a periphery of the top surface 270A to a periphery of the bottom surface 270C. In an embodiment, the top surface 270A may be formed to have a larger area than the bottom surface 270C. In an embodiment, the side surfaces 270B may be formed to approach each other in a direction from the upper bar 372 to the lower bar 374. In an embodiment, the side surface 270B is formed to have an inclination, thereby providing a space in which each upper bar 372 and each lower bar 374 may pivot.

In an embodiment, except for a region in which the accommodating groove 575 is defined, the top surface 270A of each upper bar 372 may be substantially flat. In the flat state in FIG. 5A, the top surfaces 270A of the upper bars 372 may extend without a step to form a single flat surface (e.g., a surface 372A in FIG. 3). In the flat state, the flexible region 123 of the display 120 may be supported by the upper bars 372 to maintain a substantially flat state.

Referring to FIGS. 7A and 7B, the multi-bar module 270 may be bent corresponding to the folding operation of the first housing 111 and the second housing 112. In an embodiment, each upper bar 372 may be pivoted relative to a neighboring bar. For example, each upper bar 372 may be pivoted with respect to a periphery (e.g., a periphery P) of the top surface 270A. In an embodiment, as each upper bar 372 is pivoted, the multi-bar module 270 may have a bent shape.

In an embodiment, the lower bars 374 may be coupled to the first housing 111 and the second housing 112. In an embodiment, when a user folds or unfolds the first housing 111 and the second housing 112, an external force that causes the pivoting of the upper bars 372 may be provided through the lower bars 374.

In an embodiment, when the electronic device 101 is folded, the side surfaces 270B, each of which formed by each upper bar 372 and each lower bar 374, may become closer to each other, and an angle formed by two adjacent top surfaces 270A may be reduced.

In an embodiment, when the electronic device 101 is folded, the surface formed by connecting the top surfaces 270A of the respective upper bars 372 may be substantially curved. In an embodiment, when the electronic device 101 is folded, the flexible region 123 of the display 120 and the support plate 230 may be deformed into curved surfaces corresponding to the surface of the upper bars 372.

In an embodiment, the multi-bar module 270 may deform the flexible region 123 of the display 120 into the curved surface or the flat surface when the electronic device 101 is folded or unfolded.

In an embodiment, when the flexible region 123 of the display 120 is deformed into the curved surface, a reaction force in an outward direction of the flexible region 123 (e.g., the second direction F2) may be applied to the flexible region 123. As a degree of bending of the flexible region 123 increases, the reaction force may increase. Because of the reaction force as described above, a change in a length of the flexible region 123 may be caused. Such change in the length may deteriorate a surface quality of the display 120.

In an embodiment, the reaction force acting on the flexible region 123 may be at least partially cancelled by the elastic force provided from the elastic member 350. Referring to FIG. 7A, in an embodiment, the reaction force of the flexible region 123 may be provided to the elastic member 350 through the support plate 230 and the pin member 340. In an embodiment, because of the reaction force of the flexible region 123, a force in a compression direction (e.g., a third direction F3) may be applied to the elastic member 350. Therefore, in the intermediate state, the elastic member 350 according to an embodiment may be compressed to have a second length D2. In an embodiment, the second length D2 may be smaller than the first length D1 in the unfolded state. In an embodiment, as the elastic member 350 is compressed to have the second length D2 from the first length D1, the pin member 340 may move in the third direction F3. Referring to FIG. 7B, in the folded state, the reaction force acting on the flexible region 123 may become greater than that in the intermediate state, and the elastic member 350 may be compressed to have a third length D3. In an embodiment, the third length D3 may be smaller than the second length D2 in the intermediate state.

In an embodiment, the reaction force generated when the flexible region 123 of the display 120 is deformed may be canceled by the support plate 230, the pin member 340, and the elastic member 350, so that the deterioration in the surface quality resulted from the change in the length of the flexible region 123 may be reduced or prevented.

In an embodiment, even when the length of the flexible region 123 is changed by repetition of the folding operation, because the flexible region 123 is pulled inward by the support plate 230, the pin member 340, and the elastic member 350, the surface quality of the flexible region 123 may be maintained or improved.

An electronic device (e.g., the electronic device 101 in FIG. 1A) according to an example embodiment of the disclosure may include: a first housing (e.g., the first housing 111 in FIG. 1A), a second housing (e.g., the second housing 112 in FIG. 1A), a flexible display (e.g., the flexible display 120 in FIG. 1A) disposed on the first housing and the second housing, wherein the flexible display includes a flexible region (e.g., the flexible region 123 in FIG. 1A) deformable into a flat surface or a curved surface, a support plate (e.g., the support plate 230 in FIG. 3) disposed on a rear surface (e.g., the rear surface 120B in FIG. 6) of the flexible display at least partially overlapping the flexible region, wherein the support plate includes a first region (e.g., the first region 10 in FIG. 4) attached to the rear surface of the flexible display, and a connection structure (e.g., the connection structure 113 in FIG. 1A) disposed beneath the support plate overlapping the flexible region, wherein the connection structure connects the first housing and the second housing to each other such that the first housing and the second housing are able to be folded or unfolded about a folding axis therebetween, the connection structure may include a pin member comprising at least one pin (e.g., the pin member 340 in FIG. 5A) at least partially coupled to the support plate through a second region (e.g., the second region 20 in FIG. 4) different from the first region of the support plate, and an elastic member comprising an elastic material (e.g., the elastic member 350 in FIG. 5A) configured to be compressed or tensioned based on the first housing and the second housing being folded or unfolded to provide an elastic force to the pin member, and the pin member may be configured to provide a force in a first direction toward the connection structure to the flexible region of the flexible display through the support plate.

In an example embodiment, the second region may not be attached to the rear surface of the flexible display.

In an example embodiment, the support plate may be deformable into the curved surface or the flat surface to correspond to the flexible region of the flexible display.

In an example embodiment, the elastic member may be coupled to the pin member and may be configured to be compressed or tensioned in a longitudinal direction of the pin member.

In an example embodiment, the connection structure may include a multi-bar module comprising a plurality of bars (e.g., the multi-bar module 270 in FIG. 3) disposed beneath the support plate, and the pin member may pass through the support plate and the multi-bar module.

In an embodiment, the multi-bar module may be configured to deform the flexible region of the flexible display and the support plate into the curved surface or the flat surface based on the first housing and the second housing being folded or unfolded.

In an example embodiment, the multi-bar module may include upper bars (e.g., the upper bars 372 in FIG. 3) disposed beneath the support plate and lower bars (e.g., the lower bars 374 in FIG. 3) disposed beneath the upper bars, the upper bars and the lower bars may extend in a longitudinal direction of the flexible display and may be arranged in a width direction of the flexible display, and the pin member may penetrate the support plate, the upper bars, and the lower bars.

In an example embodiment, the electronic device may further include a fixing member comprising a fastener (e.g., the fixing member 360 in FIG. 5A) fixed to an end of the pin member, and the elastic member may be coupled to the pin member and disposed between the upper bars and the fixing member.

In an example embodiment, the fixing member may include a snap ring, and the elastic member may include a coil spring.

In an example embodiment, the pin member may include a head (e.g., the head 342 in FIG. 5A) positioned in the second region of the support plate and a body (e.g., the body 344 in FIG. 5A) extending from the head through the second region, and the elastic member may be configured to provide the elastic force to the pin member such that the support plate is pressed in the first direction by the head of the pin member.

In an example embodiment, the electronic device may further include an adhesive (e.g., the adhesive member 615 in FIG. 6) disposed between the rear surface of the flexible display and the first region of the support plate.

In an embodiment, the support plate may have a thickness in a range from 0.05 mm to 0.08 mm.

In an embodiment, the support plate may comprise stainless steel or polypropylene.

An electronic device (e.g., the electronic device 101 in FIG. 1A) according to an example embodiment of the disclosure may include: a foldable housing (e.g., the foldable housing 110 in FIG. 1A) including a first housing (e.g., the first housing 111 in FIG. 1A) and a second housing (e.g., the second housing 112 in FIG. 1A), a flexible display (e.g., the flexible display 120 in FIG. 1A) disposed on the foldable housing, wherein the flexible display includes a first portion (e.g., the first region 121 in FIG. 1A) overlapping the first housing, a second portion (e.g., the second region 122 in FIG. 1A) overlapping the second housing, and a flexible portion (e.g., the flexible region 123 in FIG. 1A) extending from the first portion to the second portion and being deformable into a flat surface or a curved surface, a support plate (e.g., the support plate 230 in FIG. 3) disposed on a rear surface (e.g., the rear surface 120B in FIG. 6) of the flexible display at least partially overlapping the flexible region, wherein the support plate includes a first region (e.g., the first region 10 in FIG. 4) attached to the rear surface of the flexible display, a connection structure (e.g., the connection structure 113 in FIG. 1A) disposed beneath the support plate and overlapping the flexible region, wherein the connection structure connects the first housing and the second housing to each other such that the first housing and the second housing are able to be folded or unfolded about a folding axis therebetween, a pin member (e.g., the pin member 340 in FIG. 5A) comprising at least one pin penetrating the support plate and the connection structure to couple the support plate and the connection structure to each other, wherein the pin member penetrates a second region (e.g., the second region 20 in FIG. 4) different from the first region of the support plate, and an elastic member (e.g., the elastic member 350 in FIG. 5A) comprising an elastic material configured to be compressed or tensioned based on the foldable housing being folded or unfolded to provide an elastic force to the pin member, and the pin member may provide a force in a first direction from the display toward the connection structure to the flexible region of the flexible display through the support plate.

In an example embodiment, the connection structure may include a plurality of bars extending in a longitudinal direction of the flexible display and arranged in a width direction of the flexible display, the plurality of bars may be disposed beneath the support plate, and each pin of the pin member may include a head (e.g., the head 342 in FIG. 5A) disposed on the second region of the support plate, and a body (e.g., the body 344 in FIG. 5A) extending from each head to the outside of each of the plurality of bars through the second region of the support plate and each of the plurality of bars.

In an example embodiment, the electronic device may further include each fixing member comprising a fastener (e.g., the fixing member 360 in FIG. 5A) disposed at an end (e.g., the end 3441 in FIG. 5A) of each body positioned outside of each of the plurality of bars, and each elastic member may be coupled to each body and disposed between each of the plurality of bars and each fixing member.

In an example embodiment, the plurality of bars may include upper bars (e.g., the upper bars 372 in FIG. 5B) and lower bars (e.g., the lower bars 374 in FIG. 5B) disposed beneath the upper bars, each upper bar may have a first opening (e.g., the first opening 3721 in FIG. 5B) and a second opening (e.g., the second opening 3722 in FIG. 5B) provided therein and penetrated by the pin member, the first opening may be located beneath the support plate, and the second opening may be located beneath the first opening, each lower bar may have a third opening (e.g., the third opening 3741 in FIG. 5B) provided therein and penetrated by the pin member and located beneath the second opening, the elastic member may be at least partially accommodated in the second opening and the third opening, and the elastic member may be supported by the fixing member and a protrusion (e.g., the support portion 3723 in FIG. 5B) of the upper bar wherein the first opening has a smaller diameter than the second opening.

Figure 8:
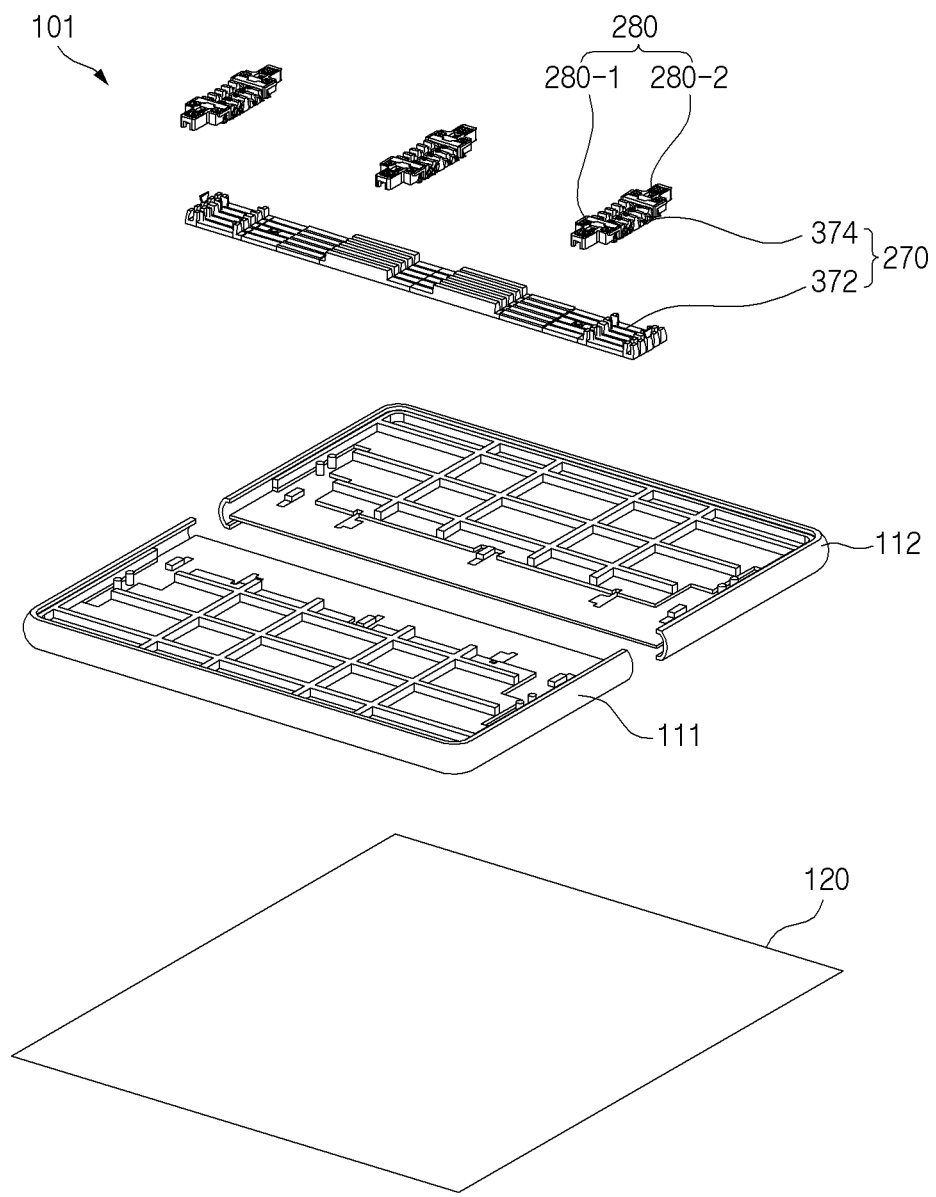
FIG. 8 is an exploded perspective view of an electronic device according to various embodiments.

FIG. 8 is an exploded perspective view of an electronic device according to various embodiments.

In FIG. 8, some of the components shown in FIGS. 2 and 3 are omitted, and a component not shown in FIG. 3 is additionally illustrated. This is for convenience of description, and is not intended to limit an embodiment shown in FIG. 8 and embodiments shown in FIGS. 2 and 3 as separate embodiments.

Referring to FIG. 8, the electronic device 101 according to an embodiment may include the pulling structure 280 disposed at both ends of the lower bars 374. In an embodiment, the pulling structure 280 may include a first pulling structure 280-1 disposed at one end (or one side) of the lower bars 374, and a second pulling structure 280-2 disposed at the other end (or the other side) of the lower bars 374. In an embodiment, the first pulling structure 280-1 and the second pulling structure 280-2 may be coupled to the lower bars 374.

Figure 9:
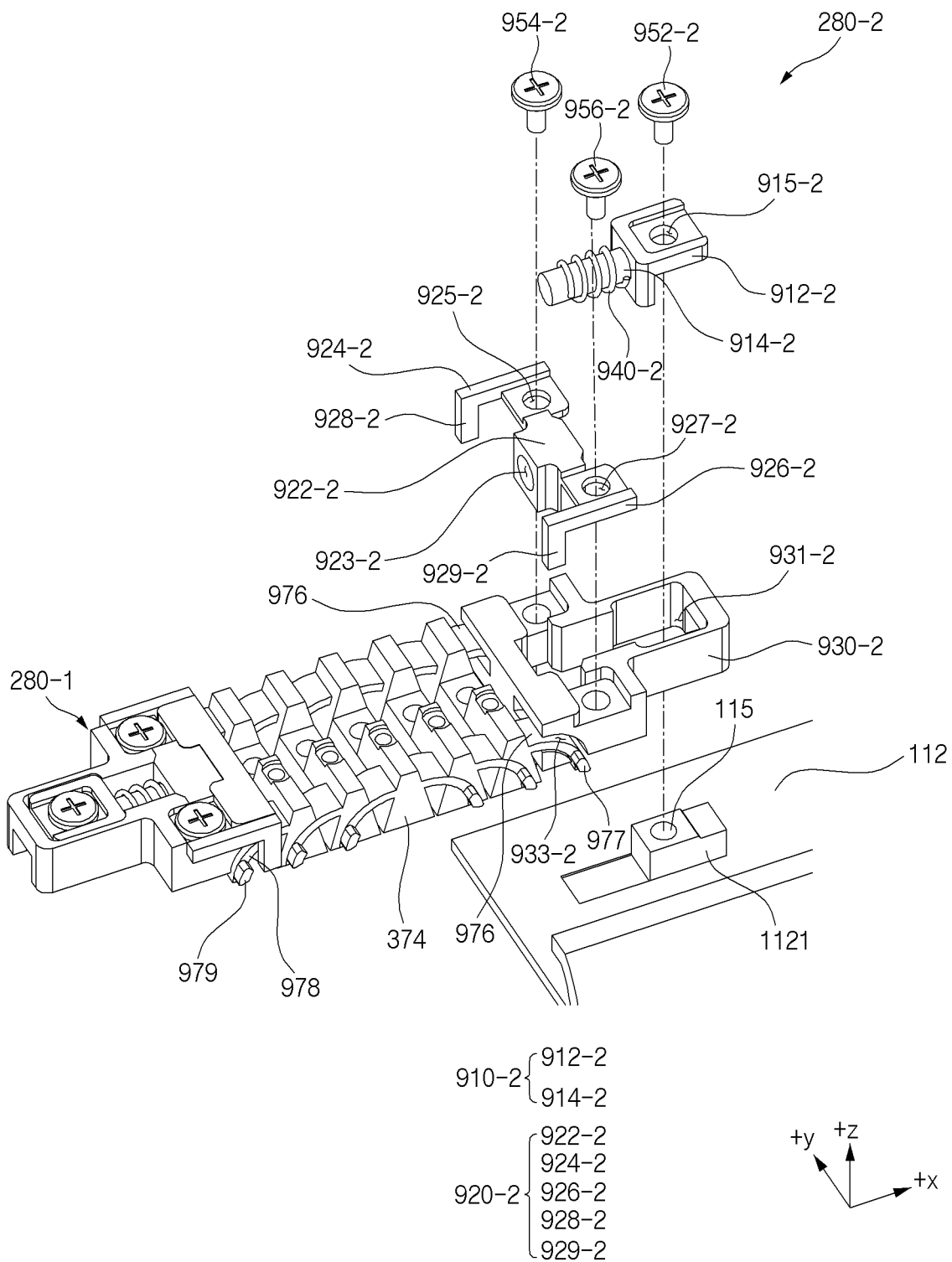
FIG. 9 is an exploded perspective view of a pulling structure according to various embodiments

FIG. 9 is an exploded perspective view of a pulling structure according to various embodiments.

Figure 10:
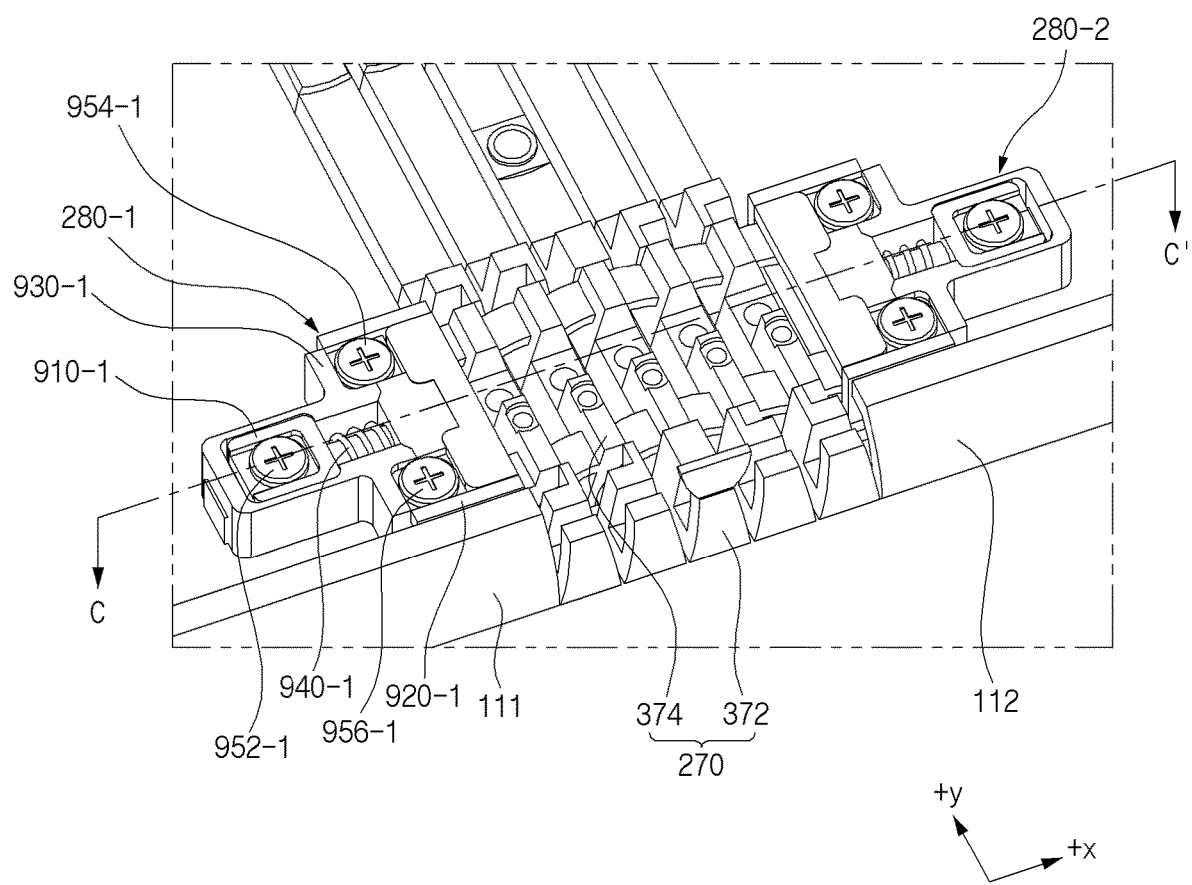
FIG. 10 is a perspective view illustrating a pulling structure according to various embodiments.

FIG. 10 is a perspective view illustrating a pulling structure according to various embodiments.

Figure 11:
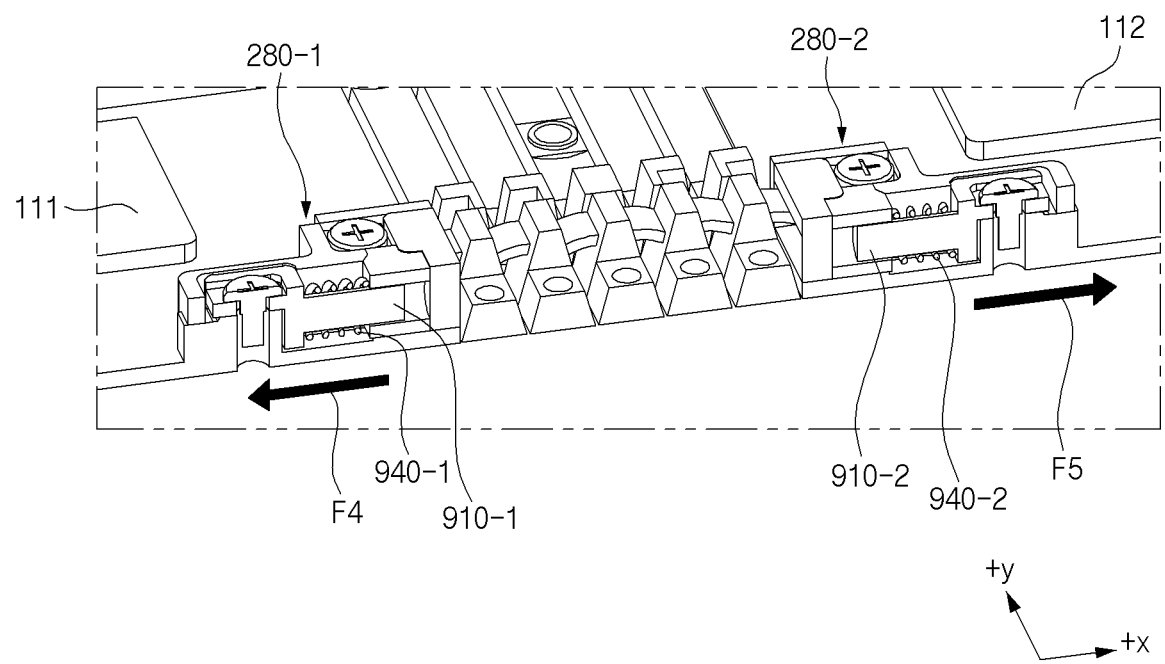
FIG. 11 is a partial sectional perspective view taken along a line C-C' of FIG. 10 according to various embodiments.

FIG. 11 is a cross-sectional view taken along a line C-C' of FIG. 10 according to various embodiments.

Referring to FIG. 9, the second pulling structure 280-2 according to an embodiment may include a first member 910-2, a second member 920-2, a third member 930-2, a second elastic member 940-2, and screws 952-2, 954-2, and 956-2.

In an embodiment, the first member 910-2 may be disposed in a hole 931-2 provided in the third member 930-2. The first member 910-2 may include a bracket 912-2 and a rod 914-2. In an embodiment, the bracket 912-2 may be disposed on a protrusion 1121 formed in the second housing 112. The bracket 912-2 may be coupled with the second housing 112. For example, as the screw 952-2 penetrating the bracket 912-2 is fastened to a fastening hole 115 defined in the protrusion 1121, the bracket 912-2 and the second housing 112 may be coupled to each other. In an embodiment, the bracket 912-2 may include a first portion that is seated on the protrusion 1121, and a second portion that is bent and extended from the first portion. A hole 915-2 through which the screw 952-2 passes may be defined in the first portion of the bracket 912-2. The second portion of the bracket 912-2 may support the second elastic member 940-2. In an embodiment, the rod 914-2 may be extended in a direction (e.g., -x direction) from the bracket 912-2 (e.g., the second portion of the bracket 912-2) toward the lower bars 374, and an end thereof may be located in a hole 923-2 defined in a first cover 922-2. In an embodiment, the rod 914-2 may have a cylindrical shape. For example, a cross-sectional shape of the rod 914-2 may be circular. In an embodiment, the second elastic member 940-2 may be coupled to the rod 914-2. In an embodiment, the second elastic member 940-2 may be disposed between the bracket 912-2 and the first cover 922-2. The second elastic member 940-2 may be compressed or tensioned based on an external force applied thereto. In an embodiment, the second elastic member 940-2 may include a coil spring, but the disclosure may not be limited thereto.

In an embodiment, the second member 920-2 may be disposed in the hole 931-2 defined in the third member 930-2. In an embodiment, the second member 920-2 may include the first cover 922-2, a second cover 924-2, a third cover 926-2, a first hook 928-2, and a second hook 929-2.

In an embodiment, the hole 923-2 through which the rod 914-2 may reciprocate may be defined in the first cover 922-2. In an embodiment, the second cover 924-2 may extend from the first cover 922-2 to one side (e.g., in a +y direction), and the third cover 926-2 may extend from the first cover 922-2 to the other side (e.g., a −y direction). The second cover 924-2 and the third cover 926-2 may be disposed on the third member 930-2. In an embodiment, the screws 954-2 and 956-2 respectively penetrating the second cover 924-2 and the third cover 926-2 are fastened to the third member 930-2, so that the second member 920-2 and the third member 930-2 may be coupled to each other. In an embodiment, holes 925-2 and 927-2 respectively penetrated by the screws 954-2 and 956-2 may be defined in the second cover 924-2 and third cover 926-2, respectively.

In an embodiment, the first hook 928-2 may extend in a direction (e.g., a −z direction) toward the second housing 112 from the second cover 924-2. The second hook 929-2 may extend in the direction (e.g., the −z direction) toward the second housing 112 from the third cover 926-2. The first hook 928-2 and the second hook 929-2 may extend along an outer surface of the third member 930-2 to cross a guide groove 933-2 defined in the third member 930-2.

In an embodiment, the third member 930-2 may be disposed on the second housing 112. The third member 930-2 may be connected to the lower bars 374 through a rail 976, and may reciprocate along a shape of the rail 976. In an embodiment, in the third member 930-2, the guide groove 933-2 having a shape corresponding to that of the rail 976 may be defined such that the second pulling structure 280-2 may reciprocate along the rail 976. In an embodiment, the rail 976 and the guide groove 933-2 may include a curved surface, and the second pulling structure 280-2 may be capable of curved movement. In an embodiment, at one end of the rail 976, a hook protrusion 977 for limiting a moving distance of the second pulling structure 280-2 and preventing and/or reducing the second pulling structure 280-2 from deviating from the lower bars 374 may be formed. For example, the hook protrusion 977 may protrude out of the guide groove 933-2, and at least partially overlap each of the first hook 928-2 and the second hook 929-2 when viewed in the +x axis direction.

The description of the second pulling structure 280-2 described above may be applied in a substantially the same, similar, or corresponding manner to the first pulling structure 280-1. For example, the first pulling structure 280-1 may be connected to the lower bars 374 in a scheme in which a rail 978 and a hook protrusion 979 formed on the lower bars 374 are accommodated therein. For example, referring to FIG. 10, the first pulling structure 280-1 may include a first member 910-1, a second member 920-1, a third member 930-1, a first elastic member 940-1, and screws 952-1, 954-1, and 956-1 respectively corresponding to the first member 910-2, the second member 920-2, the third member 930-2, the second elastic member 940-2, and the screws 952-2, 954-2, and 956-2 of the second pulling structure 280-2.

Referring to FIG. 11, in an embodiment, the first elastic member 940-1 may provide an elastic force in the fourth direction F4 to the first member 910-1 of the first pulling structure 280-1, and the first pulling structure 280-1 may move along the fourth direction F4. In an embodiment, a force in the fourth direction F4 may act on the first housing 111 coupled with the first pulling structure 280-1. The force provided allows the first housing 111 to move in the fourth direction F4. In an embodiment, the fourth direction F4 may be a direction parallel to a direction in which the first elastic member 940-1 is compressed or tensioned (e.g., a longitudinal direction of a rod of the first member 910-1), and a direction from the lower bars 374 to the first housing 111.

In an embodiment, the second elastic member 940-2 may provide an elastic force in the fifth direction F5 to the first member 910-2 of the second pulling structure 280-2, and the second pulling structure 280-2 may move along the fifth direction F5. In an embodiment, a force in the fifth direction F5 may act on the second housing 112 coupled with the second pulling structure 280-2. The force provided allows the second housing 112 to move in the fifth direction F5. In an embodiment, the fifth direction F5 may be a direction parallel to a direction in which the second elastic member 940-2 is compressed or tensioned (e.g., a longitudinal direction of the rod 914-2 in FIG. 9), and a direction from the lower bars 374 to the second housing 112.

In an embodiment, as the first housing 111 and the second housing 112 are respectively moved in the fourth direction F4 and the fifth direction F5, the forces in the fourth direction F4 and the fifth direction F5 may act on the display 120 attached to the first housing 111 and the second housing 112, and the display 120 may be pulled in both directions away from the lower bars 374. In an embodiment, as the pulling structure 280 prevents and/or reduces the display 120 from being lifted or creased, the surface quality of the display 120 may be improved.

An electronic device (e.g., the electronic device 101 in FIG. 1A) according to an example embodiment described above may include: a first housing (e.g., the first housing 111 in FIG. 1A), a second housing (e.g., the second housing 112 in FIG. 1A), a flexible display (e.g., the flexible display 120 in FIG. 1A) disposed on the first housing and the second housing, wherein the flexible display includes a flexible region (e.g., the flexible region 123 in FIG. 1A) deformable into a flat surface or a curved surface, a support plate (e.g., the support plate 230 in FIG. 3) disposed on a rear surface (e.g., the rear surface 120B in FIG. 6) of the flexible display at least partially overlapping the flexible region, wherein the support plate includes a first region (e.g., the first region 10 in FIG. 4) attached to the rear surface of the flexible display, and a connection structure (e.g., the connection structure 113 in FIG. 1A) disposed beneath the support plate overlapping the flexible region, wherein the connection structure connects the first housing and the second housing to each other such that the first housing and the second housing are able to be folded or unfolded with a folding axis interposed therebetween, the connection structure may include a pin member comprising at least one pin (e.g., the pin member 340 in FIG. 5A) at least partially coupled to the support plate through a second region (e.g., the second region 20 in FIG. 4) different from the first region of the support plate, and an elastic member comprising an elastic material (e.g., the elastic member 350 in FIG. 5A) configured to be compressed or tensioned based on the first housing and the second housing being folded or unfolded to provide an elastic force to the pin member, and the pin member may provide a force in a first direction toward the connection structure to the flexible region of the flexible display through the support plate.

In an example embodiment, the flexible display may include a first region (e.g., the first region 121 in FIG. 1A) attached to the first housing and a second region (e.g., the second region 122 in FIG. 1A) attached to the second housing, the flexible region of the flexible display may extend from the first region of the flexible display to the second region of the flexible display, the electronic device may include a first pulling structure (e.g., the first pulling structure 280-1 in FIG. 8) and a second pulling structure (e.g., the second pulling structure 280-2 in FIG. 8) disposed with the connection structure therebetween, the first pulling structure may include a first part (e.g., the first member 910-1 in FIG. 10) coupled to the first housing, and a first elastic member comprising an elastic material (e.g., the first elastic member 940-1 in FIG. 10) configured to provide an elastic force to the first part, the second pulling structure may include a second part (e.g., the first member 910-2 in FIG. 9) coupled to the second housing, and a second elastic member comprising an elastic material (e.g., the second elastic member 940-2 in FIG. 9) configured to provide an elastic force to the second part, the first part may provide a force in a second direction from the connection structure toward the first part to the first region of the flexible display through the first housing, and the second part may provide a force in a third direction from the connection structure toward the second part to the second region of the flexible display through the second housing.

In an example embodiment, the first pulling structure may include a first rod (e.g., the rod 914-2 in FIG. 9) extending from the first part toward the connection structure, and a first cover (e.g., the first cover 922-2 in FIG. 9) having a first hole (e.g., the hole 923-2 in FIG. 9) provided therein, wherein the first rod is movable in the first hole, and the second pulling structure includes a second rod (e.g., the rod 914-2 in FIG. 9) extending from the second part toward the connection structure, and a second cover (e.g., the first cover 922-2 in FIG. 9) having a second hole (e.g., the hole 923-2 in FIG. 9) provided therein, wherein the second rod is movable in the second hole.

In an example embodiment, the first pulling structure may include a third part (e.g., the third member 930-1 in FIG. 10) pivotably coupled to the connection structure, wherein the first part and the first cover are accommodated in a hole (e.g., the hole 931-2 in FIG. 9) provided in the third part, the second pulling structure may include a fourth part (e.g., the third member 930-2 in FIG. 9) pivotably coupled to the connection structure, wherein the second part and the second cover are accommodated in a hole (e.g., the hole 931-2 in FIG. 9) provided in the fourth member, the first cover may be fixedly coupled to the third part, the first part may move in the hole defined in the third part based on the elastic force provided by the first elastic member, the second cover may be fixedly coupled to the fourth part, and the second part may move in the hole provide in the fourth part based on the elastic force provided by the second elastic member.

Figure 12:
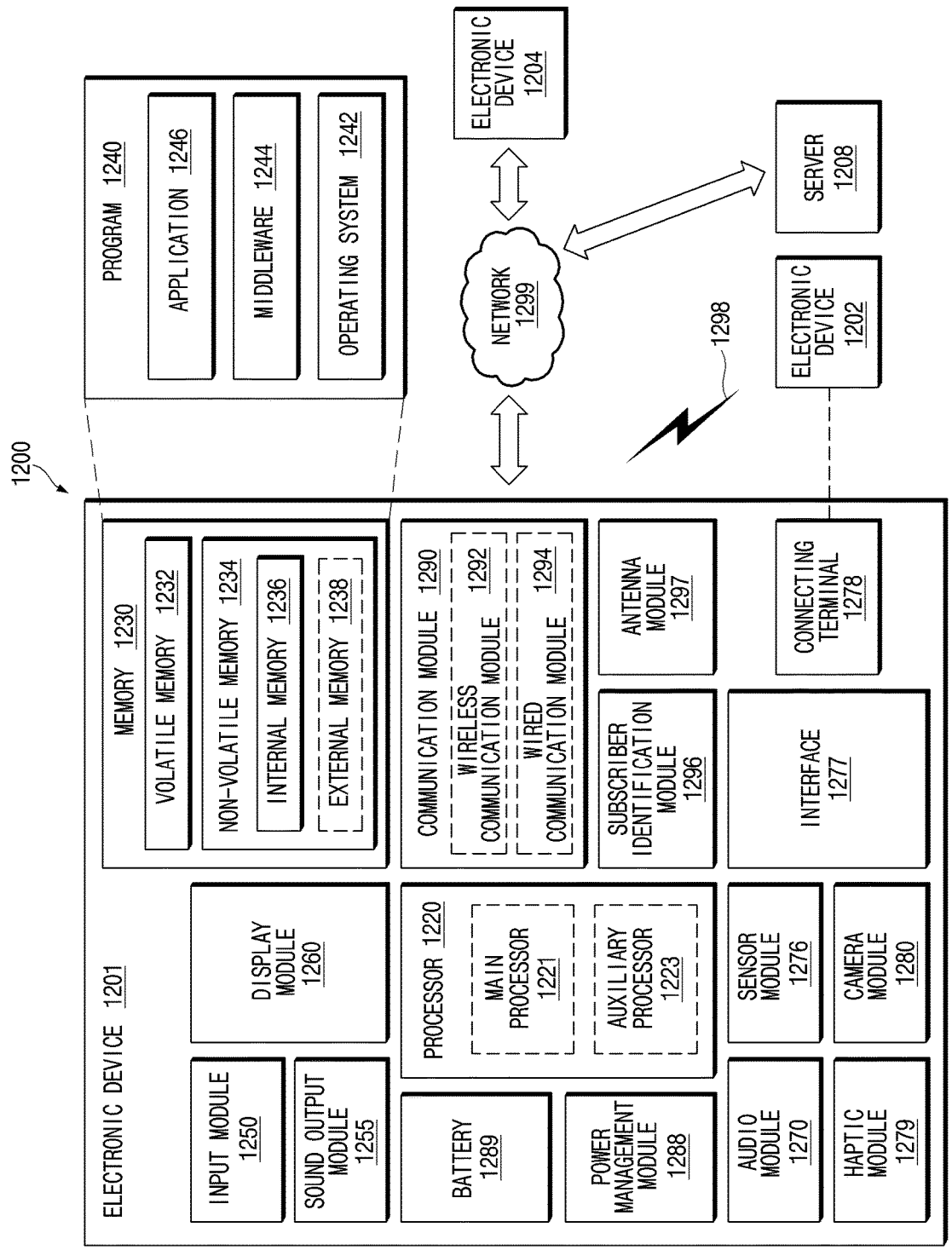
FIG. 12 is a block diagram illustrating an example electronic device in a network environment according to various embodiments.

FIG. 12 is a block diagram illustrating an example electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In various embodiments, at least one of the components (e.g., the connecting terminal 1278) may be omitted from the electronic device 1201, or one or more other components may be added in the electronic device 1201. In various embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to an embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 1264 dB or less) for implementing mMTC, or U-plane latency (e.g., 0.5 ms or less for each of downlink (DL) and uplink (UL), or a round trip of 12 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element including a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201.

According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In an embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing;
   a second housing;
   a flexible display disposed on the first housing and the second housing, wherein the flexible display includes a flexible region deformable into a flat surface or a curved surface;
   a support plate disposed on a rear surface of the flexible display at least partially overlapping the flexible region, wherein the support plate includes a first region attached to the rear surface of the flexible display; and
   a connection structure disposed beneath the support plate overlapping the flexible region, wherein the connection structure connects the first housing and the second housing to each other such that the first housing and the second housing are able to be folded or unfolded about a folding axis therebetween, wherein the connection structure includes:
      a pin member comprising at least one pin at least partially coupled to the support plate through a second region different from the first region of the support plate; and
      an elastic member comprising an elastic material configured to be compressed or tensioned based on the first housing and the second housing being folded or unfolded to provide an elastic force to the pin member,
      wherein the pin member is configured to provide a force in a first direction toward the connection structure to the flexible region of the flexible display through the support plate.

2. The electronic device of claim 1, wherein the second region is not attached to the rear surface of the flexible display.

3. The electronic device of claim 1, wherein the support plate is deformable into the curved surface or the flat surface to correspond to the flexible region of the flexible display.

4. The electronic device of claim 1, wherein the elastic member is coupled to the pin member and is configured to be compressed or tensioned in a longitudinal direction of the pin member.

5. The electronic device of claim 1, wherein the connection structure includes a multi-bar module comprising multiple bars disposed beneath the support plate,
   wherein the pin member passes through the support plate and the multi-bar module.

6. The electronic device of claim 5, wherein the multi-bar module is configured to deform the flexible region of the flexible display and the support plate into the curved surface or the flat surface based on the first housing and the second housing being folded or unfolded.

7. The electronic device of claim 5, wherein the multi-bar module includes upper bars disposed beneath the support plate and lower bars disposed beneath the upper bars,
   wherein the upper bars and the lower bars extend in a longitudinal direction of the flexible display and are arranged in a width direction of the flexible display,
   wherein the pin member penetrates the support plate, the upper bars, and the lower bars.

8. The electronic device of claim 7, further comprising a fixing member comprising a fastener fixed to an end of the pin member,
   wherein the elastic member is coupled to the pin member and disposed between the upper bars and the fixing member.

9. The electronic device of claim 8, wherein the fixing member includes a snap ring,
   wherein the elastic member includes a coil spring.

10. The electronic device of claim 8, wherein each pin of the pin member includes a head positioned in the second region of the support plate and a body extending from the head through the second region,
    wherein the elastic member is configured to provide the elastic force to the pin member such that the support plate is pressed in the first direction by the head of the pin member.

11. The electronic device of claim 1, further comprising an adhesive member comprising an adhesive disposed between the rear surface of the flexible display and the first region of the support plate.

12. The electronic device of claim 1, wherein the support plate has a thickness in a range of 0.05 mm to 0.08 mm.

13. The electronic device of claim 1, wherein the support plate comprises stainless steel or polypropylene.

14. The electronic device of claim 1, wherein the flexible display includes a first region attached to the first housing and a second region attached to the second housing,
    wherein the flexible region of the flexible display extends from the first region of the flexible display to the second region of the flexible display,
    wherein the electronic device includes a first pulling structure and a second pulling structure disposed with the connection structure therebetween, wherein the first pulling structure includes:
- a first part coupled to the first housing; and
- a first elastic member comprising an elastic material configured to provide an elastic force to the first part, wherein the second pulling structure includes:
- a second part coupled to the second housing; and
- a second elastic member comprising an elastic material configured to provide an elastic force to the second part, wherein the first part is configured to provide a force in a second direction from the connection structure toward the first part to the first region of the flexible display through the first housing, wherein the second part is configured to provide a force in a third direction from the connection structure toward the second part to the second region of the flexible display through the second housing.

15. The electronic device of claim 14, wherein the first pulling structure includes a first rod extending from the first part toward the connection structure, and a first cover including a first hole, wherein the first rod is movable in the first hole, wherein the second pulling structure includes a second rod extending from the second part toward the connection structure, and a second cover having a second hole, wherein the second rod is movable in the second hole.

16. The electronic device of claim 15, wherein the first pulling structure includes a third part pivotably coupled to the connection structure, wherein the first part and the first cover are accommodated in a hole in the third part, wherein the second pulling structure includes a fourth part pivotably coupled to the connection structure, wherein the second member and the second cover are accommodated in a hole in the fourth part, wherein the first cover is fixedly coupled to the third part, wherein the first part is configured to move in the hole in the third part based on the elastic force provided by the first elastic member, wherein the second cover is fixedly coupled to the fourth part, wherein the second part is configured to move in the hole in the fourth part based on the elastic force provided by the second elastic member.

17. An electronic device comprising:
a foldable housing including a first housing and a second housing;
a flexible display disposed on the foldable housing, wherein the flexible display includes a first portion overlapping the first housing, a second portion overlapping the second housing, and a flexible portion extending from the first portion to the second portion and being deformable into a flat surface or a curved surface;
a support plate disposed on a rear surface of the flexible display at least partially overlapping the flexible region, wherein the support plate includes a first region attached to the rear surface of the flexible display;
a connection structure disposed beneath the support plate and overlapping the flexible region, wherein the connection structure connects the first housing and the second housing to each other such that the first housing and the second housing are able to be folded or unfolded about a folding axis therebetween;
a pin member comprising at least one pin penetrating the support plate and the connection structure to couple the support plate and the connection structure to each other, wherein the pin member penetrates a second region different from the first region of the support plate; and
an elastic member comprising an elastic material configured to be compressed or tensioned based on the foldable housing being folded or unfolded to provide an elastic force to the pin member,
wherein the pin member is configured to provide a force in a first direction from the display toward the connection structure to the flexible region of the flexible display through the support plate.

18. The electronic device of claim 17, wherein the connection structure includes a plurality of bars extending in a longitudinal direction of the flexible display and arranged in a width direction of the flexible display,
wherein the plurality of bars are disposed beneath the support plate,
wherein each pin of the pin member includes a head disposed on the second region of the support plate, and a body extending from each head to the outside of each of the plurality of bars through the second region of the support plate and each of the plurality of bars.

19. The electronic device of claim 18, further comprising a fixing member comprising a fastener disposed at an end of each body positioned outside of each of the plurality of bars,
wherein each elastic member is coupled to a respective body and disposed between each of the plurality of bars and each fixing member.

20. The electronic device of claim 19, wherein the plurality of bars includes upper bars and lower bars disposed beneath the upper bars,
wherein each upper bar has a first opening and a second opening penetrated by the pin member,
wherein the first opening is located beneath the support plate, and the second opening is located beneath the first opening,
wherein each lower bar has a third opening penetrated by the pin member and located beneath the second opening,
wherein the elastic member is at least partially accommodated in the second opening and the third opening,
wherein the elastic member is supported by the fixing member and a protrusion of the upper bar wherein the first opening has a smaller diameter than the second opening.

* * * * *